(12) United States Patent
Arai et al.

(10) Patent No.: US 7,248,315 B2
(45) Date of Patent: Jul. 24, 2007

(54) LIQUID CRYSTAL DISPLAY DEVICE CAPABLE OF TRANSMISSION DISPLAY AND REFLECTION DISPLAY

(75) Inventors: Norihiro Arai, Hino (JP); Toshiharu Nishino, Hamura (JP); Tsuyoshi Suzuki, Machida (JP); Kunpei Kobayashi, Tachikawa (JP); Ryota Mizusako, Sagamihara (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 10/651,647

(22) Filed: Aug. 28, 2003

(65) Prior Publication Data

US 2004/0125285 A1   Jul. 1, 2004

(30) Foreign Application Priority Data

Aug. 30, 2002   (JP) .............................. 2002-252311
Aug. 30, 2002   (JP) .............................. 2002-252312
Sep. 25, 2002   (JP) .............................. 2002-279683

(51) Int. Cl.
*G02F 1/1335* (2006.01)
(52) U.S. Cl. ...................................... 349/114; 349/106
(58) Field of Classification Search ................ 349/113, 349/114, 155, 156, 106
See application file for complete search history.

(56) References Cited

U.S. PATENT DOCUMENTS 6,281,952 B1 * 8/2001 Okamoto et al. ............. 349/12
6,570,634 B2   5/2003 Kim
6,697,137 B2 * 2/2004 Nemoto et al. ............. 349/113
6,885,418 B2 * 4/2005 Matsushita et al. ......... 349/113
2002/0075441 A1 * 6/2002 Fujimori et al. ............ 349/155
2005/0062909 A1 * 3/2005 Ikeno et al. ................ 349/106

FOREIGN PATENT DOCUMENTS

| JP | 10-288706 A | 10/1998 |
| JP | 11-264964 A | 9/1999 |
| JP | 2000-267081 A | 9/2000 |
| JP | 2001-125094 A | 5/2001 |
| JP | 2001-166289 A | 6/2001 |
| KR | 2001-0062353 A | 7/2001 |
| KR | 2001-0094908 A | 11/2001 |
| KR | 2002-0051858 A | 6/2002 |

* cited by examiner

*Primary Examiner*—James A. Dudek
(74) *Attorney, Agent, or Firm*—Frishauf, Holtz, Goodman & Chick, P.C.

(57) ABSTRACT

A plurality of reflection films are provided behind a liquid crystal layer of a liquid crystal element, corresponding to predetermined regions in the plural pixels Pix. By the regions of the plural pixels wherein the reflection films are provided, reflection parts Pr are formed that reflects the light that enters from the front side and goes out to the front side by the region where the reflection film is provided, and transmission parts are formed that transmits the light that enters from the back side and goes out to the front side by the other regions of the plural pixels. At the same time, color filters, wherein a plurality of apertures are formed to the parts corresponding to the reflection pars Pr of the pixels Pix, are provided respectively corresponding to the plural pixels Pix, and a planarization transparent film covering the aperture is formed on these color filters.

15 Claims, 14 Drawing Sheets

LIQUID CRYSTAL DISPLAY DEVICE CAPABLE OF TRANSMISSION DISPLAY AND REFLECTION DISPLAY

BACKGROUND OF THE INVENTION

1. Field of the Invention

The present invention relates to a liquid crystal display device which carries out display of both the transmission display and the reflection display.

2. Description of the Related Art

A reflection/transmission type liquid crystal display device which carries out both the reflection display, which uses the external light, which is a light of the environment wherein the liquid crystal device is used, and the transmission display, which uses illumination light from the light source placed at a back side of the device.

A liquid crystal display device of this type, as disclosed in the Unexamined Japanese Patent Application KOKAI Publication No.H11-264964, has a liquid crystal layer arranged between the front side substrate, which is arranged at the observing side of the display, and the back side substrate, which faces the front side substrate, and at least one electrode which is provided on either one inner surface, of which the front side substrate and back side substrate oppose each other, and a plurality of electrodes to form a plurality of pixels on the other inner surface, which pixels are formed of regions wherein the plurality of electrodes and the at least one electrode face each other. A plurality of reflection films, each corresponding to pre-determined regions in the plural pixels, are provided behind the liquid crystal layer of the liquid crystal display device, and by the regions of pixels which the reflection films are provided, reflection parts are formed, wherein light enters from the front side and is reflected by the reflection films, and by the regions other than the reflection parts of the plural pixels, transmission parts are formed, which emit light to the front side by transmitting the light coming from the back side. Then, color filters to carry out color display, are provided in either one inner surface, of which the front side substrate and back side substrate surface, a front side polarization plate and a back side polarization plate are placed on the front and back side of a liquid crystal element respectively, and the light source is placed behind the back side polarization plate.

In an environment where the intensity of illumination is enough, this reflection/transmission type liquid crystal display carries out the reflection display using external light, and in a case where there isn't enough light, carries out the transmission display using the illumination light emitted from the light source. This reflection/transmission type liquid crystal display uses the reflection parts of the plural pixels of the liquid crystal element to carry out the reflection display, and uses the transmission parts of the plural pixels of the liquid crystal element to carry out the transmission display.

However, the conventional reflection/transmission type liquid crystal display device which displays color image, has a problem that the quality of the displayed image of the reflection display using external light, and the quality of the displayed image of the transmission display using light from the light source, are different from each other.

Namely, in the conventional reflection/transmission type liquid crystal display device which displays the color image, in a case of reflection display, light enters into the liquid crystal element from the front side of the liquid crystal element, and is reflected by the reflection film after transmitting the color filters and liquid crystal element, and goes out to the front side of the liquid crystal element after transmitting through the liquid crystal layer and color filters, and in a case of transmission display, light enters into the liquid crystal element from the back side, and through the liquid crystal layer and color filters, goes out to the front side of the liquid crystal element. Resulting to the outgoing light at the reflection display time being colored light, which transmitted to and from the liquid crystal layer and the color filters, and the outgoing light at the transmission display time being colored light, which transmitted through the liquid crystal layer and the color filter, just once.

Therefore, the emitted light in a case of reflection display has weaker optical power, compared to the emitted light in a case of transmission display. Therefore, the display quality of the liquid crystal display device, at the reflection display time, is not well.

Therefore, as disclosed in the Unexamined Japanese Patent Application KOKAI Publication No.H10-288706, colored parts and a white transparent parts formed in the pixel to brighten the reflection display, is proposed.

However, the liquid crystal element which has an aperture partially, in a part corresponding to the interior of the reflection part of the pixel of the color filter, is formed in a shape that the cross-section of the circumference of the aperture of the color filter is slanted diagonally to the normal line of the substrate. Therefore, it is difficult to accurately set the ratio of the colored light emitted from the region corresponding to the parts besides the aperture of the color filter, and the non-colored light emitted from the region corresponding to the aperture of the color filter, among the reflection part of each pixel, and the color reproducibility at the reflection display time becomes inferior.

Similar liquid crystal display device is disclosed in the Unexamined Japanese Patent Application KOKAI Publication No.H11-264964. The disclosure is incorporate herein by reference in their entirety.

SUMMARY OF THE INVENTION

The object of this invention is to provide a reflection/transmission liquid crystal display device that displays a high quality color image in a case of both the reflection display and the transmission display.

Another object of this invention is to provide a liquid crystal display device that has an excellent color reproducibility that can emit colored light and non-colored light from the reflection part of the plural pixels at a highly precise emitting rate, and a producing method thereof.

To achieve the above mentioned objects, a liquid crystal display device according to a first aspect of this invention comprises:

a front side substrate placed on an observer side of the liquid crystal display device;

a back side substrate placed having a predetermined gap between the front side substrate so that the back side substrate faces the opposite side of the observer side of the front side substrate wherein a liquid crystal layer is filled between the back side substrate and the front side substrate;

at least one common electrode formed on one inner surface of the front side substrate, or an inner surface of the back side substrate; wherein the inner surface of the front side substrate and the inner surface of the back side substrate face each other;

a plurality of pixel electrodes formed on the other inner surface of the front side substrate, or the inner surface of the back side substrate, wherein a region where each of the plural pixel electrode faces the common electrode respectively, forms one pixel;

a plurality of reflection films provided on a side of the liquid crystal layer where the back side substrate is placed, wherein the liquid crystal layer is arranged between the front side substrate and the back sides substrate, so that the reflection films respectively correspond to predetermined parts of the plural pixels, for forming reflection parts that reflect lights that enter in a direction from the front side substrate to the back side substrate, to a direction from the back side substrate to the front side substrate, and transmission parts that transmit lights that enter the part other than the predetermined parts of the plural pixels from the back side substrate and goes out from the front side substrate;

a plurality of color filters provided on an inner surface of the front side substrate or the back side substrate, so that the color filters respectively correspond to the plural pixels; wherein at least one color of the plural color filters is a different color from the other color filters;

a transparent member provided in at least the reflection parts of the plural pixels in the inner surface wherein the color filters are provided, so that a high transmission rate of light is realized; and a front side polarization plate provided at the observer side of the front side substrate, and a back side polarization plate provided at the opposite side of the observer side of the back side substrate.

According to the invention, because a transparent member for realizing the high transmission rate of the light of the reflection parts is provided to the parts at least corresponding to the reflection parts of the color filters, a color image of a high quality can be displayed in a case of both the reflection display and the transmission display.

Also, in the liquid crystal display device, a transparent film may be formed on the parts at least corresponding to the reflection part of the color filters, filling the interior of apertures formed in the color filters. In this case, a color image of a further higher quality can be displayed in a case of both the reflection display and the transmission display.

In this liquid crystal display device, it is preferable to form a plurality of apertures to the parts corresponding to the reflection parts of the plural color filters, and by doing so, a transparent film with a high planarization is formed on the color filters, the electro-optic characteristic of the liquid crystal layer of the region corresponding to the reflection parts becomes even, and both the colored light and non-colored light can be emitted at a high emitting rate from the reflection parts.

In that case, in a case where the plural color filters are set to red, green, and blue color filters, it is preferable that the number of apertures of the green filters is large than the number of apertures of the red filter and blue filter, and by doing so, it is possible to emit red, green and blue colored light at a good color balance, and a display with a high quality color image without color shift is realized.

Additionally, in the liquid crystal display device, it is preferable to add light diffusion particles to the transparent film formed on the color filters, and by doing so, the exterior scene reflecting on the reflection film can be prevented, and an image of a higher quality can be displayed. Also, in the liquid crystal display device, it is preferable that the liquid crystal layer of the reflection parts of the pixels are formed thinner than the liquid crystal layer thickness of the transmission parts, and in that case, the liquid crystal layer thickness of the reflection parts of the pixels is adjusted by an adjustment film of the liquid crystal layer thickness comprised of the transparent film, or the reflection film.

Furthermore, it is preferable that this liquid crystal display device is comprised of an element that provides to the transmission light, a change of ¼ retardation of the wavelength $\lambda$ of the light, in a case where an electric field is applied between the common electrode and the pixel electrode, and it is preferable to place a $\lambda/4$ retardation plate at least in between the front side polarization plate and the liquid crystal element among the front side polarization plate and back side polarization plate. By doing so, it is possible to carry out a reflection display that is bright and has a high contrast.

Moreover, in this liquid crystal display device, transparent member made of photosensitive resin may be formed on the aperture part of the color filters. By doing so, it is possible to provide the plural color filters respectively corresponding to the plural pixels so that the side surface of the filter that surrounds the non-colored layer contacts the periphery surface of the non-colored layer, and colored light and non-colored light can be emitted from the reflection parts of the plural pixels at a highly accurate ratio, and an excellent color reproducibility can be gained.

In this case, the transparent member may be formed in a substantially same thickness as the thickness of the color filters. Or, this transparent member may have a cross sectional shape substantially the same as the plane shape of the apertures of the color filters, and may form a spacer wherein the film thickness is thicker than the color filters, and contacts the inner surface of the facing substrate, and has a thickness for setting the thickness of the liquid crystal layer to a predetermined thickness, and according to this kind of structure, the non-colored layer can also be a columnar spacer for defining the substrate gap.

A liquid crystal display device according to a second aspect of the invention comprises:

a front side substrate placed on an observer side of the liquid crystal display device;

a back side substrate placed having a predetermined gap between the front side substrate so that the back side substrate faces the opposite side of the observer side of the front side substrate wherein a liquid crystal layer is filled between the back side substrate and the front side substrate;

at least one common electrode formed on one inner surface of the front side substrate, or an inner surface of the back side substrate; wherein the inner surface of the front side substrate and the inner surface of the back side substrate face each other;

a plurality of pixel electrodes formed on the other inner surface of the front side substrate, or the inner surface of the back side substrate, wherein a region where each of the plural pixel electrode faces the common electrode respectively, forms one pixel;

a plurality of reflection films provided on a side of a liquid crystal layer where the back side substrate is placed, wherein the liquid crystal layer is arranged between the front side substrate and the back side substrate, so that the reflection films respectively correspond to a predetermined part of the plural pixels, for forming reflection parts that reflect lights that enter in a direction from the front side substrate to the back side substrate, to a direction from the back side substrate to the front side substrate, and transmission parts that transmit lights that enter the part other than the predetermined parts of the plural pixels, from the back side substrate and goes out from the front side substrate;

a plurality of color filters provided on the inner surface of the front side substrate or the back side substrate, so that the color filters respectively correspond to the plural pixels; wherein at least one color of the plural color filters is a different color from the other color filters, and comprised of a plurality of transmission part color filter having a predetermined thickness, placed at parts corresponding to the transmission parts of the plural pixels, and a plurality of reflection part color filters having a thinner thickness than the transmission part color filters, placed at parts corresponding to the reflection parts of the plural pixels;

a transparent member provided in at least the reflection parts of the plural pixels in the inner surface wherein the color filters are provided, so that a high transmission rate of light is realized; and a front side polarization plate provided at the observer side of the front side substrate, and a back side polarization plate provided at the opposite side of the observer side of the back side substrate.

Because the transparent member for realizing the high transmission rate of light is provided in at least the reflection part of the each pixel in the inner surface of the substrate, wherein the color filters are provided, the high transmission rate of light of the reflection parts can be realized, and a color image of a high quality can be displayed in a case of both the reflection display and the transmission display.

In this liquid crystal display device, it is preferable that the reflection parts, of the reflection parts and transmission parts that comprise each pixel, have a liquid crystal layer of a smaller layer thickness than the layer thickness of the liquid crystal of the transmission parts, and light diffusion member is contained in the transparent member.

Furthermore, this liquid crystal display device may be comprised of a liquid crystal element that provides to the transmission light, a change of ¼ retardation of the wavelength λ of the light. In this case, it is preferable to place a λ/4 retardation plate at least in between the front side polarization plate and the liquid crystal element. By having this kind of structure, it is possible to carry out a reflection display that is bright and has a high contrast.

Additionally, in this liquid crystal display device, it is preferable that the liquid crystal layer of the reflection parts of each pixel is formed thinner than the liquid crystal layer thickness of the transmission parts.

A producing method of the liquid crystal display device according to a third aspect comprises:

a step for forming on a front side substrate of the front side substrate placed at the observer side, and a back side substrate facing the front side substrate, placed facing each other, a plurality of pixel electrodes facing a common electrode formed on an inner surface facing the back side substrate of the front side substrate, wherein a region where each of the plural pixel electrode respectively faces the common electrode forms one pixel, and a plurality of reflection films for forming a reflection part that reflects a light that enters in a direction from the front side substrate to the back side substrate, to a direction from the back side substrate to the front side substrate, and a transmission part that transmits a light that enters the part other than the predetermined parts of the plural pixels, from the back side substrate and goes out from the front side substrate; so that the reflection films respectively correspond to predetermined parts of the plural pixels;

a step for
coating photosensitive transparent resin on the back side substrate, forming a plurality of non-colored layers by exposing and developing the resin film, and patterning the resin film to a shape each partially corresponding to the reflection parts of the plural pixels, coating photosensitive colored resist including a pigment on the back side substrate, patterning the color resist film to a shape respectively corresponding to the reflection parts of the plural pixels, after exposing and developing the color resist film, forming a plurality of color filters by removing the color resist on the non-colored layers, wherein at least one color of the plural color filters is different from the other colors of the color filters; and forming the common electrode facing the pixel electrodes, on the color filters and the non-colored layers that are formed on the back side substrate; and a step for respectively placing the front side substrate and the back side substrate so that the surfaces wherein the pixel electrode and the common electrode are formed facing each other, and sticking the front side substrate to the back side substrate putting the liquid crystal layer in between; and a step for placing polarization plates to both sides of the respectively stuck together front side substrate and back side substrate.

Because the producing method of the display device according to the third aspect, can form the plural color filters respectively corresponding to the plural pixels, so that the side surface of the filter that surrounds the non-colored layer contacts the periphery surface of the non-colored layer, the colored light and non-colored light can be emitted from the reflection parts of the plural pixels at a precise ratio, and an excellent color reproducibility can be gained.

In the producing method of this liquid crystal display device, the step for forming the non-colored layer may have a step wherein a spacer is formed to maintain a gap between the front side substrate and the back side substrate wherein the spacer has a thickness for setting the thickness of the liquid crystal layer by contacting the inner surfaces of the front side substrate and the back side substrate, facing each other, with using a photosensitive transparent resin.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Liquid crystal display devices will be described below as embodiments of the present invention with reference to the accompanying drawings.

First Embodiment

Figure 1:
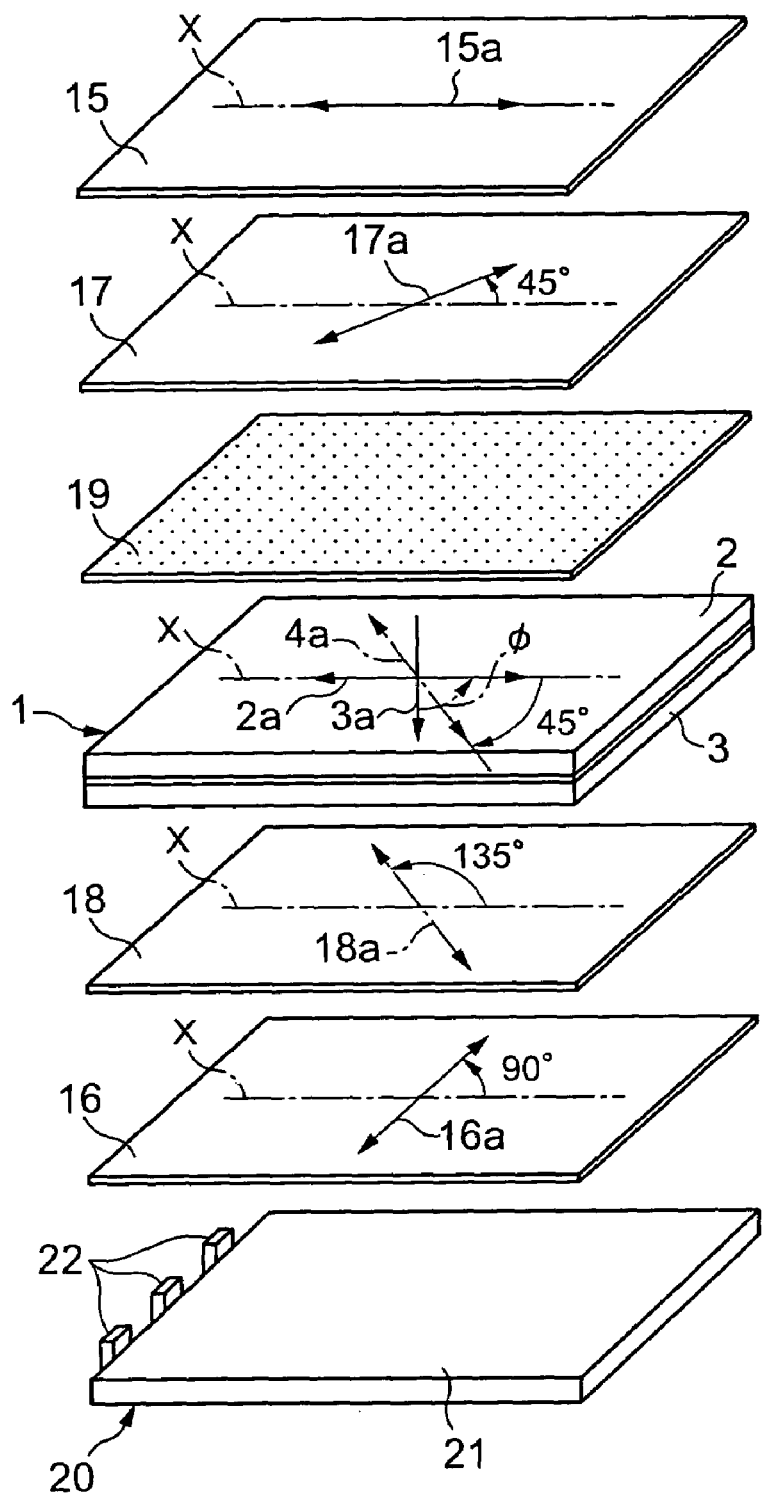
FIG. 1 is an exploded perspective view of the liquid crystal display device in the first embodiment of the present invention.
Figure 2:
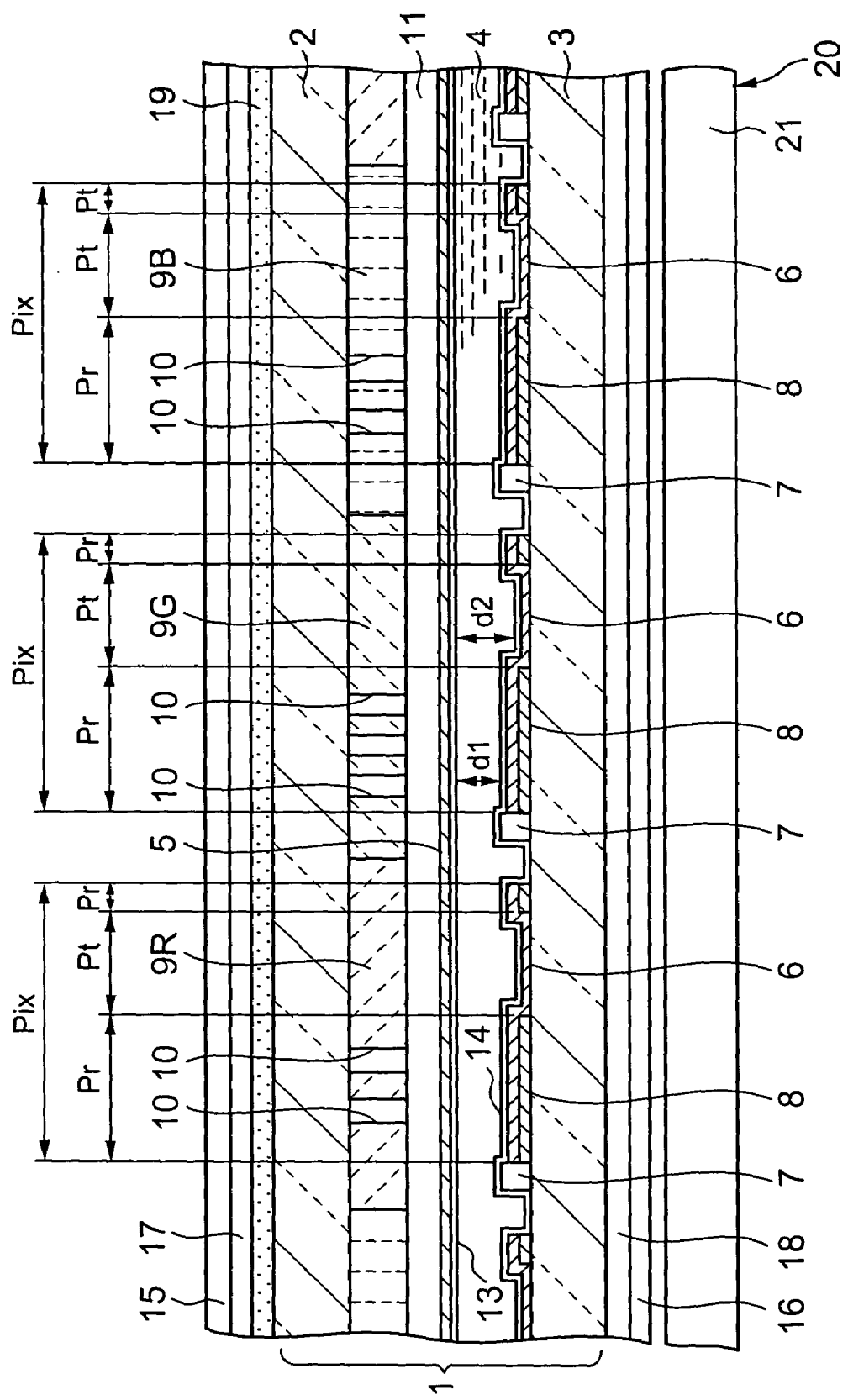
FIG. 2 is a cross sectional view of a part of the liquid crystal display device in the first embodiment of the present invention.
Figure 3:
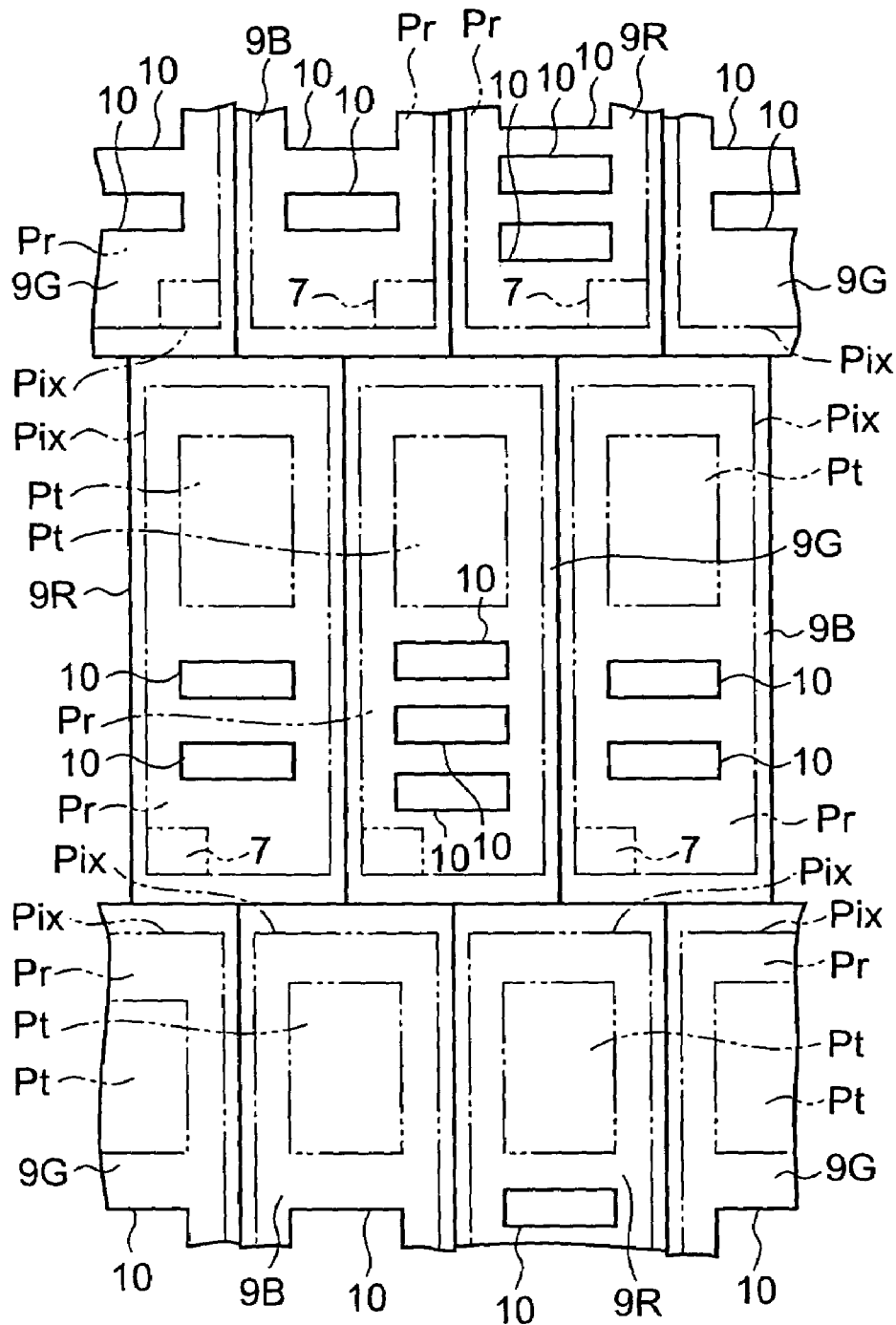
FIG. 3 is a plane view of a plurality of pixels and color filter of the liquid crystal element of the liquid crystal display device in the first embodiment of the present invention.

FIGS. 1 to 6A, B show the first embodiment of the present invention, and FIG. 1 is an exploded perspective view of the liquid crystal display device, FIG. 2 is a cross sectional view of a part of the liquid crystal display device, FIG. 3 is a plane view of a plurality of pixels and color filters of the liquid crystal element of the liquid crystal display device.

As described in FIG. 1 and FIG. 2, the liquid crystal display device of this embodiment, comprises a liquid crystal element 1, a front side polarization plate 15 and a back side polarization plate 16 placed on the front and back side of the liquid crystal element 1 respectively, a front side retardation plate 17 placed in between the liquid crystal element 1 and the front side polarization plate 15, and a back side retardation plate 18 placed in between the liquid crystal element 1 and the back side polarization plate 16, a diffusing layer 19 placed between the liquid crystal element 1 and the front side retardation plate 17, and light source 20 placed behind the back side polarization plate 16.

As shown in FIG. 2 and FIG. 3, the liquid crystal element 1 has a liquid crystal layer 4 between a front side transparent substrate 2, which is arranged in the front side as the observing side of the display (upper side in FIG. 2), and a transparent substrate 3, which faces the front side substrate 2, and at least one transparent electrode 5 is provided in either one inner surface of the opposing front side substrate 2 and back side substrate 3, and at the other inner surface, a plurality of transparent electrodes 6 which are provided for forming a plurality of pixels by the regions wherein the plurality of transparent electrodes 6 face the at least one electrode 5. A plurality of reflection films 8, each of the reflection films 8 corresponding to a predetermined region in the plural pixels are provided behind the liquid crystal layer 4, and by the region of which the reflection films 8 of the plural pixels Pix are provided, reflection parts Pr are formed, wherein light enters from the front side, and is reflected by the reflection films 8, and goes out from the front side, and by the region other than the reflection parts Pr of the plural pixels Pix, transmission parts Pt are formed, wherein light is sent out from the front side by transmitting the light coming in from the back side.

This liquid crystal element 1 is an active matrix liquid crystal element which for example contains TFT (Thin Film Transistor) as an active element, and the electrode 5 which is placed on the inner surface of the front side substrate 2, is a common electrode, which is a single film, and the electrodes 6 which are placed on the inner surface of the back side substrate 3 are a plurality of pixel electrodes formed being placed line-wise and column-wise, namely in a matrix form.

On the inner surface of the back side substrate 3, TFTs 7, each corresponding to each plural pixel electrodes 6, are provided, and a plurality of gate wirings which supply gate signals to the TFTs 7 in each line, and a plurality of gate wirings which supply data signals to the TFTs 7 in each column (both of which will not be illustrated) are provided.

FIG. 2 shows the simplified TFTs 7, but each TFT 7 comprises: a gate electrode formed on the substrate surface of the back side substrate 3, a gate insulation film which covers this gate electrode and most of the substrate 3, an i-type semiconductor film formed facing the gate electrode on the gate insulation film, and a source electrode and a drain electrode formed through an n-type semiconductor film on both side portions of the i-type semiconductor film.

Among the non-illustrated gate wirings and data wirings, the gate wirings are covered by the gate insulation film, being formed on the substrate surface of the back side substrate 3, integrally with the gate electrodes of the TFTs 7, and the data wirings are formed on the gate insulation film, and are connected to the drain electrodes of the TFTs 7.

The plural reflection films 8 are mirror reflection films of high reflective rate made of Aluminum contained alloy. In this embodiment, as shown in FIG. 2, the plural reflection films 8 are formed on the inner surface of the back side substrate 3 (for example on the un-illustrated gate insulation film), and a part of each pixel electrode 6 is formed on the corresponding reflection film 8.

The plural reflection films 8 are provided corresponding to the circumference of the rim part of the plural pixels Pix, and the region almost half of the center part of the plural pixels Pix excluding the rim part respectively. The reflection parts Pr are formed by the rim part of the plural pixels Pix, and the region almost half of the center part, and the transmission parts Pt are formed by the other region almost half of the center part.

In this embodiment, the each reflection part Pr is formed so that its area is 55 to 75 percent of the area of the each pixel Pix, and the each transmission part Pt is formed so that its area is 25 to 65 percent of the area of the each pixel Pix.

Furthermore, on either inner surface of the front side substrate 2 or the back side substrate 3 of this liquid crystal element 1, for example on the inner surface of the front side substrate 2, a plurality of color filters each corresponding to the plural pixels Pix are provided. For example, color filters 9R, 9G, and 9B, in the colors of red, green, and blue are provided, respectively corresponding to the plural pixels Pix.

As shown in FIG. 3, this liquid crystal element 1 includes the pixels Pix arranged in a delta arrangement (also known as mosaic arrangement). In the delta arrangement, the pixel Pix corresponding to the red filter 9R, the pixel Pix corresponding to the green filter 9G, and the pixel Pix corresponding to the blue filter 9B, are disposed alternately, and the pixels Pix corresponding to the same color filters 9R, 9G, and 9B are disposed in each line, being displaced to the pixels Pix in the next lines by 1.5 pitch sideways. FIG. 2 represents a cross section of the red, green, and blue color filters corresponding to each pixel, disposed in a zigzag arrangement.

The red, green, blue color filters 9R, 9G, and 9B, are each formed in a film thickness so that the light that transmits these color filters 9R, 9G, and 9B to one direction can go out as colored light that has enough color purity and high enough intensity. Furthermore, in parts corresponding to the reflection parts Pr of the pixels Pix of the color filters 9R, 9G, and 9B, a plurality of apertures 10 which penetrate each color filter 9R, 9G and 9B are partially provided.

The red, green, and blue color filters 9R, 9G, and 9B, each color the lights that entered the parts other than the aperture 10, to red, green or blue, by absorbing the component having the wavelength corresponding to the absorption wavelength of each color filter 9R, 9G, and 9B, and transmits the light that entered the aperture 10 without coloring the light. The colored and non-colored lights are emitted from the part corresponding to the reflection part Pr of the pixel Pix, and the colored lights are emitted from the whole area which corresponds to the transmission part Pt of the pixel Pix.

As shown in FIG. 3, each aperture 10 of the color filters 9R, 9G, and 9B, is formed in a long hole shape sideways, has a width about the same as the line-wise width (horizontal width in FIG. 3) of the transmission part Pt of the pixel Pix, and the plurality of apertures 10 are provided in a wide-range (region continuing throughout the width of the filter) of a portion which corresponds to the reflection part Pr of the color filters 9R, 9G, and 9B, at an interval which is approximately even column-wise (longitudinal in FIG. 3).

Furthermore, the plurality of apertures 10 of the red, green, and blue color filters 9R, 9G, and 9B are each formed having the same area (length and width), and the number of apertures 10 of the each color filter 9R, 9G, or 9B, namely the ratio of the whole area of the apertures 10 to the whole area of the parts that correspond to the reflection part Pr of the each color filter 9R, 9G, or 9B is set so that the combined light of the colored light transmitted by going to and from the part corresponding to the reflection part Pr of the each color filter 9R, 9G, or 9B, and the non-colored light has enough color purity and intensity.

More specifically, among the light which enters the reflection parts Pr of the plurality of pixels Pix from the front side of the liquid crystal element 1, and goes out to the front side of the liquid crystal element 1, being reflected by the reflection film 8, the colored light colored in the parts other than the apertures 10 of the color filters 9R, 9G, and 9B is light that went to and from the color filters 9R, 9G and 9B and transmitted, undergoing absorption twice. Therefore, compared to colored light, which goes into the transmission parts Pt of the plurality of pixels Pix from the back side of the liquid crystal element 1, and transmits the colored filters 9R, 9G, and 9B once to one direction, and goes out to the front side of the liquid crystal element 1, the above colored light that underwent absorption twice, is a darker light.

On the other hand, among the light which enters the reflection parts Pr of the plurality of pixels Pix from the front side of the liquid crystal element 1, and goes out to the front side of the liquid crystal element 1, being reflected by the reflection film 8, the light which transmits through the interior of the apertures 10 of the color filters 9R, 9G, and 9B is non-colored light which did not undergo absorption by the color filters 9R, 9G, and 9B.

Therefore, by adequately setting the ratio of the whole area of the plurality of apertures 10 to the whole area of the parts that correspond to the reflection part Pr of the color filters 9R, 9G, and 9B, namely by adequately setting the light amount ratio of the each colored light which transmits to and from the part corresponding to the reflection part Pr of the each color filter 9R, 9G, and 9B, and the non-colored light which transmits the interior of the aperture 10 of the color filter 9R, 9G, and 9B, bright colored light can be emitted from the reflection part Pr.

It is preferable that the ratio of the whole area of the plurality of apertures 10 to the whole area of the parts corresponding to the reflection part Pr of the each red, green, and blue color filter 9R, 9G, and 9B is equal to or is smaller than 50 percent.

In this case, among the lights colored by the red, green and blue color filters 9R, 9G, and 9B, the brightness of the green light is weak to the observer visually.

Therefore, in this embodiment, among the color filters 9R, 9G, and 9B, the number of apertures 10 in the reflection part Pr of the green filter 9G, is larger than the each number of the apertures 10 in the reflection part Pr of the red filter 9R, and the blue filter 9B. By setting the ratio of the whole area of the plural apertures 10 to the ratio of the whole area of the parts corresponding to the reflection part Pr of the green color filter 9G, larger than the ratios of the whole area of the plural apertures 10 to the whole area of the parts corresponding to the reflection part Pr of the red filter 9R, and blue filter 9B, the green light emitted from the reflection part Pr of the green color filter 9G is bright, and red, green and blue colored lights are emitted from the reflection parts Pr of the plural pixels Pix, with a good color balance.

Furthermore, it is preferable that the ratio of the whole area of the plurality of apertures 10 to the whole area of the part corresponding to the reflection part Pr of the each red filter 9R and blue filter 9B, is 20 to 40 percent, and the ratio of the whole area of the plurality of apertures 10 to the whole area of the part corresponding to the reflection part Pr of the green color filter 9G is 30 to 50 percent.

In this embodiment, as shown in FIG. 2 and FIG. 3, by respectively forming two apertures 10 in the parts corresponding to the reflection parts Pr of the red filter 9R and blue filter 9B, and three apertures 10 in the parts corresponding to the reflection part Pr of the green filter 9G, the ratio of the whole area of the plurality of apertures 10 to the ratio of the whole area of the parts corresponding to the reflection part Pr of the each color filters 9R, 9G, and 9B is set as the above.

Moreover, on the color filters 9R, 9G, and 9B, prepared on the inner surface of the front side substrate 2, a transparent film 11 (herein after referred to as planarization transparent film) for planarizing the surface facing the liquid crystal layer 4 of the color filters 9R, 9G, and 9B, throughout the whole region, is provided, and the common electrode 5 is formed on the planarization transparent film 11.

The planarization transparent film 11 is formed by applying the liquid resin by a screen printer, etc., on the color filters 9R, 9G, and 9B, and then hardening the liquid resin after the film surface of the applied resin becomes flat by the natural flow. In this embodiment, because the plurality of apertures 10 are formed in the parts corresponding to the reflection part Pr of the color filter 9R, 9G, and 9B, and the ratios of the whole area of the plural apertures 10 to the whole area of the parts corresponding to the reflection part Pr of the color filters 9R, 9G, and 9B are set so that colored lights of enough color purity and intensity can be gained, a planarization transparent film 11 with a highly planarized film surface can be formed.

Only one aperture may be formed in a part corresponding to the reflection part Pr of the each color filter 9R, 9G, and 9B. In that case, by forming the aperture having an area equivalent to the whole area of the plural apertures 10, bright colored light can be emitted from the each reflection part Pr.

However, if one aperture having a large area equivalent to the whole area of the plural apertures 10, is formed in the part corresponding to the reflection part Pr of the each color filter 9R, 9G, and 9B, the planarization of the film surface of the planarization transparent film 11 deteriorates.

Figure 4A:
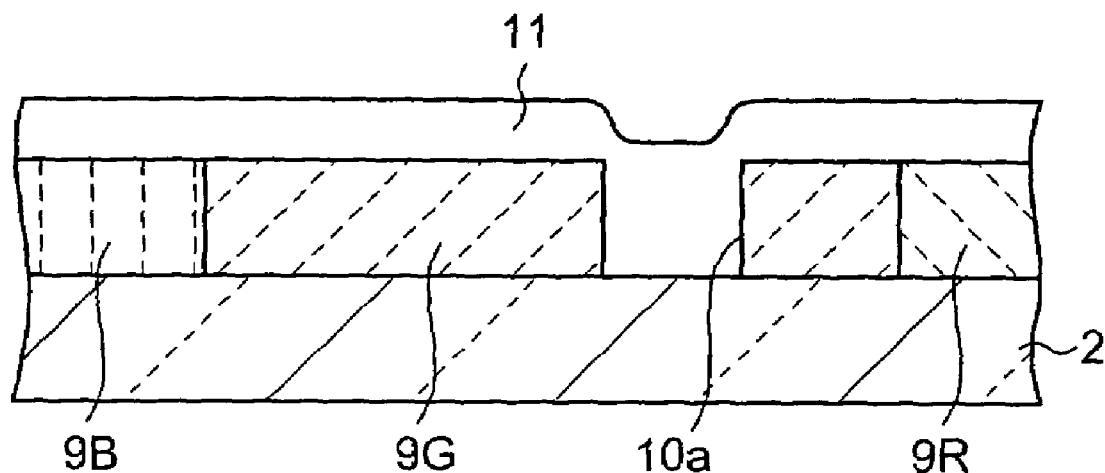
FIG. 4A and FIG. 4B are drawings showing the forming situation of the planarization transparent film in a case where one aperture of a large area is formed on the color filter, and a plurality of apertures of a small area are formed on the color filter.

Namely, FIG. 4A shows the surface condition of the planarization transparent film 11, in a case where one aperture 10a with a large area is formed in the part corresponding to reflection part Pr of the each color filter 9R, 9G, and 9B. In this case, because a large amount of the liquid resin applied on the color filters 9R, 9G, and 9B flow into the aperture 10a having a large area, a planarization transparent film 11 with the part of the film surface corresponding to the aperture 10a being dented to a certain extent is formed.

Figure 4B:
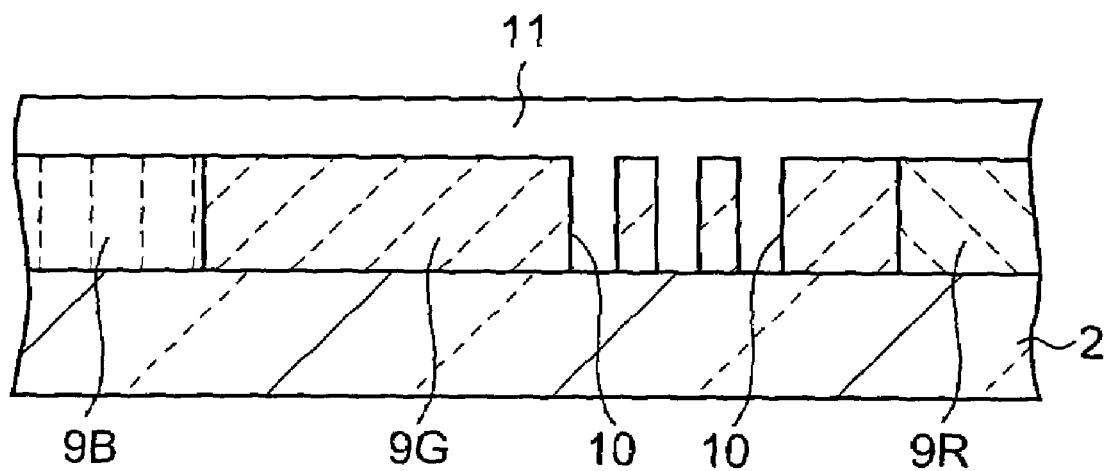

On the other hand, FIG. 4B shows the surface condition of the planarization transparent film 11 in a case where a plurality of apertures 10 with small areas are formed in the each color filter 9R, 9G, and 9B. In this case, because the liquid resin applied on the color filters 9R, 9G, and 9B flow into the plural apertures 10 having small area, a planarization transparent film 11 that has a film surface that is flat, in between the part that corresponds to the plural apertures 10, and the parts other than the part that corresponds to the plural apertures 10, namely, a film surface with a high planarization is formed.

Also, the front side substrate 2 and back side substrate 3 are connected through a not shown rim-shaped seal, which surrounds the display area that the plural pixels Pix dispose in a matrix form, and liquid crystal layer 4 is formed by filling Nematic liquid crystal having a plus anisotropic dielectric in the area surrounded by the seal in between the substrates 2 and 3.

Furthermore, on surfaces contacting the liquid crystal layer 4 of the front side substrate 2 and the back side substrate 3, alignment films 13, and 14 are prepared respectively. The orientations of the liquid crystal molecules of the liquid crystal layer 4 are defined by the alignment films 13, and 14, near the substrates 2, and 3, and the arrangement of the liquid crystal molecules is twisted at a predetermined twist angle Ø, in between the front and back substrates 2 and 3.

In this embodiment, in a case where the liquid crystal layer thickness in each of the reflection parts Pr of the plural pixels Pix of the liquid crystal element, is $d_1$ and the liquid crystal layer thickness in each of the transmission parts Pt of the plural pixels of the liquid Å crystal element is $d_2$, the liquid crystal layer thickness $d_1$ and $d_2$ is set so that it is $d_1 \approx d_2$. The value of the twist angle Ø of the liquid crystal molecule arrangement of the liquid crystal layer 4, and the value of Δnd, multiplying anisotropic refractive index Δn of liquid crystal in the reflection part Pr and the transmission part Pt of the each pixel Pix, to the liquid crystal layer thickness d (hereinafter the Δnd of the reflection part is described as $\Delta nd_1$, and the transmission part is described as $\Delta nd_2$) are set so that a retardation that provides a phase difference of ¼ wavelength (approximately 140 nm) between the ordinary light and the extraordinary light included in the light transmitting the liquid crystal element 1, in a field-free case where an electric field is not applied, wherein the arrangement of the liquid crystal molecules is in an initiate twist state, and the retardation substantially turns to zero in a case where the electric field wherein liquid crystal molecules substantially orient vertically to the surface of the substrates 2 and 3, is applied between the electrodes 5 and 6.

It is preferable that the twist angle Ø of the liquid crystal molecule arrangement of the liquid crystal layer 4 is in a range of 60 degrees to 70 degrees, and the value of the $\Delta nd_1$ in the reflection part Pr, and the value of the $\Delta nd_2$ in the transmission part Pt of each pixel Pix are 195±10 nm to 235±10 nm. By setting the values of the twist angle Ø of the liquid crystal molecule arrangement and $\Delta nd_1$, $\Delta nd_2$, in the ranges, a retardation of a ¼ wavelength can be provided to the liquid crystal layer 4 in the field-free case.

In this embodiment, the twist angle Ø of the liquid crystal molecule arrangement is set to 64 degrees, and the values of $\Delta nd_1$ and $\Delta nd_2$ in the reflection part Pr and transmission part Pt of each pixel Pix, are set at 195±10 nm, thereby the liquid crystal layer 4 is provided with a retardation of ¼ wavelength in the field-free case.

In this embodiment, the orientation 3a of the liquid crystal molecule close to the back side substrate 3, is set 64 degrees counter clock-wise, looking from the front side, and the arrangement of the liquid crystal molecules, as shown by the dotted arrow in FIG. 1, indicating the twist direction, twists in a twist angle Ø of 64 degrees counter clock-wise, from the back side substrate 3 towards the front side substrate 2. Therefore it could be said that the liquid crystal layer 4 is a retardation plate having a slow axis 4a placed 45 degrees clock-wise looking from the front side (the opposite direction from the twist direction of the liquid crystal molecule arrangement), to orientation 2a of the liquid crystal molecule close to the front side substrate 2.

In the liquid crystal element 1, as shown in FIG. 1, for example, the orientation 2a of liquid crystal molecule, which is close to the front side substrate 2, is set parallel to the horizontal axis x of the screen of the liquid crystal display device (front surface of the front side polarization plate 15), and the slow axis 4a of the liquid crystal layer 4 is set so as to intersect at a 45 degree to the horizontal axis x of the screen.

Furthermore, the front side polarization plate 15 is placed, so that its transmission axis 15a intersects to the slow axis 4a of the liquid crystal layer 4 of the liquid crystal element 1 at an intersection degree of 45 degrees, and the back side polarization plate 16 is placed so that its the transmission axis 16a is orthogonal to the transmission axis 15a of the front side polarization plate 15.

In this embodiment, as shown in FIG. 1, the front side polarization plate 15 is placed, so that the transmission axis 15a is placed 45 degrees counter clock-wise looking from the front side to the slow axis 4a of the liquid crystal layer 4 of the liquid crystal element 1, namely in a direction parallel to the horizontal axis x of the screen, and the back side polarization plate 16 is placed, so that the transmission axis 16a is placed intersecting the horizontal axis x of the screen at a degree of 90 degrees.

On the other hand, the front side retardation plate 17 and back side retardation plate 18 are respectively, λ/4 retardation plates which give a phase difference of ¼ wavelength between the ordinary light and extraordinary light of the transmission light, and the front side retardation plate 17 is placed, so that its slow axis 17a intersects the transmission axis 15a of the front side polarization plate 15 at a degree of 45 degrees, and the back side retardation plate 18 is placed so that its slow axis 18a is orthogonal to the slow axis 17a of the front side retardation plate 17.

In this embodiment, as shown in FIG. 1, the front side retardation plate 17 is placed so that the slow axis 17a is placed 45 degree counter clock-wise looking from the front side, to the horizontal axis x of the screen parallel to the transmission axis 15a of the front side polarization plate 15, and the back side retardation plate 18 is placed so that the slow axis 18a is placed in a 135 degree counter clock-wise, looking from the front side, to the horizontal axis x of the screen.

Additionally, the diffusion layer 19 placed between the liquid crystal element 1 and the front side retardation plate 17, is a forward diffusion layer which diffuses the light coming in from one surface, and emits the light from the other surface. This diffusion layer 19 is comprised of adhesive containing light diffusion particles, or of transparent resin film.

Furthermore, the light source 20, placed behind the back side polarization plate 16, is a surface light source which emits illumination light of an even brightness distribution towards the whole back surface of the back side polarization plate 16. This surface light source 20, as shown in FIG. 1, is comprised of an optical waveguide plate 21 which is a transparent plate such as an acrylic resin plate, and has one end surface as an incident end surface where light enters the end surface, and light emitting elements 22 are provided facing the incident end surface of the optical waveguide 21.

The surface light source 20 in the present embodiment is comprised of a plurality of light emitting elements 22 comprised of LED (Light Emitting Diode) being placed facing the incident end surface of the optical waveguide plate 21, but the light emitting elements 22 being placed facing the incident end surface of the optical waveguide plate 21, may be cold cathode tubes in straight tube shape.

By lighting the light emitting element 22, the surface light source 20 emits the illumination light emitted by the light emitting element 22 and lead by the aforementioned optical waveguide 23 from its fronts surface. The illumination light from the light emitting element 22, incidents on the incident end surface of the optical waveguide plate 21, repeats total reflection at the border surface of the front and back surfaces of the optical waveguide plate 21 and outside atmosphere (air). Accordingly, the incident light is lead through the interior of the optical waveguide plate 21, and is emitted from the whole area of the front side of the optical waveguide 21.

This liquid crystal display device comprises a plurality of reflection films 8, each corresponding to pre-determined regions in the plural pixels, provided behind the liquid crystal layer 4 (in this embodiment, in the inner surface of the back side substrate 3). By the region which the reflection films 8 of the plural pixels are provided, reflection parts Pr are formed, wherein light enters from the front side, and is reflected by the reflection films 8 and goes out from the front side, and by the region other than the reflection parts Pr of the plural pixels, transmission parts Pt are formed, which emits light to the front side by transmitting the light coming from the back side. Then, a front side polarization plate 15 and a back side polarization plate 16 are placed on the front and back side of the liquid crystal element 1, the front side retardation plate 17 and the back side retardation plate 18 placed in between the liquid crystal element 1 and the front side polarization plate 15, and in between the liquid crystal element 1 and the back side polarization plate 16, and the source light 20 is placed behind the back side polarization plate 16. Therefore, in an environment where there is enough light, reflection display using the external light can be carried out, and in a case where enough light can not be gained, transmission display by using illumination light from the surface light source 20 can be carried out.

Namely, this liquid crystal display device carries out reflection display using the reflection parts Pr of the plural pixels Pix of the liquid crystal element 1, and carries out transmission display using the transmission parts Pt of the plural pixels Pix of the liquid crystal element 1.

Figure 5A:
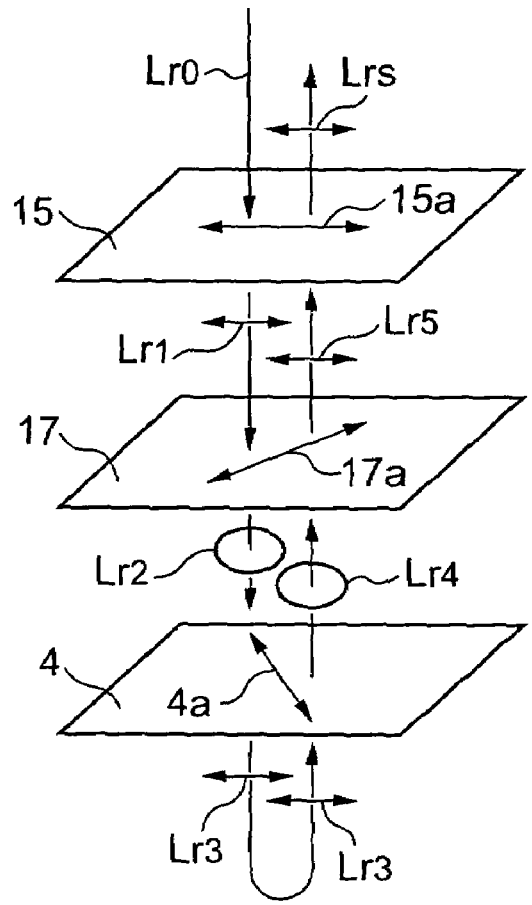
FIG. 5A and FIG. 5B are operation describing views in the reflection display of the liquid crystal display device in the first embodiment of the present invention.
Figure 5B:
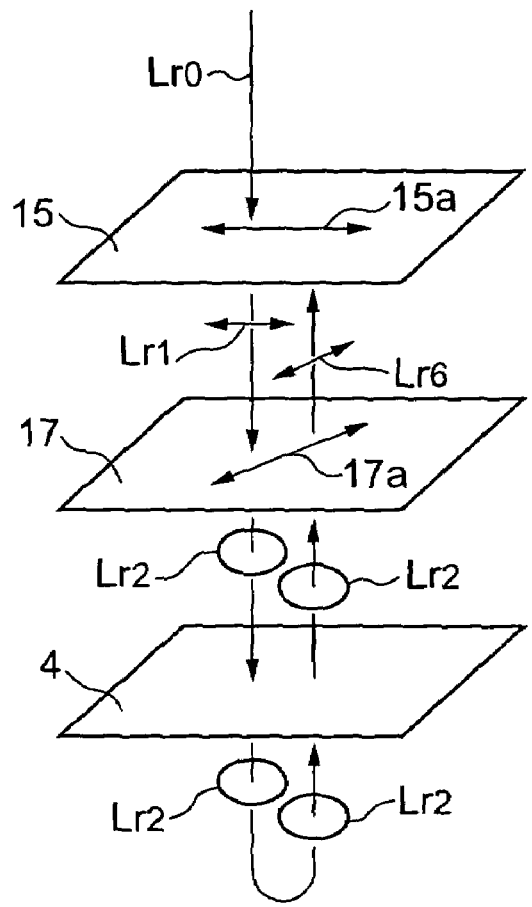

Now, the reflection display using external light will be explained. FIGS. 5A, and 5B are views showing the operation of the liquid crystal display device executing the reflection display, and indicates the display in a part corresponding to the reflection part Pr of one pixel Pix of the liquid crystal element 1.

FIG. 5A shows a field-free case where the twist arrangement of the liquid crystal molecules of the liquid crystal layer 4 in the pixel Pix is in an initial state, and FIG. 5B shows an electric field applied case where the electric field, in which liquid crystal molecules substantially stand up vertically to the surfaces of the substrates 2, and 3, is applied between electrodes 5, and 6.

This liquid crystal display device, in a reflection display case, carries out a single polarization plate type reflection display, which enables the front side polarization plate 15 placed on the front side of the liquid crystal element 1, to serve as both the light polarizer and the analyzer. In this liquid crystal display device, because the front side retardation plate 17 which provides a phase difference of ¼ wavelength between the ordinary light and extraordinary light of the transmission light is placed between the liquid crystal element 1 and the front side polarization plate 15, as shown in dotted lines in FIGS. 5A, and B, the external light (not polarized) $L_{r0}$ entering from the front side of the display, which is the observer side, is converted to a linearly polarized light $L_{r1}$ that has a polarization component parallel to the transmission axis 15a by the front side polarization plate 15, and is further converted to a circularly polarized light by the front side retardation plate 17, and enters into the liquid crystal element 1.

Then, in this liquid crystal display device, the twist angle Ø of the liquid crystal molecule arrangement of the liquid crystal layer 4 of the liquid crystal element 1, and the values of $\Delta nd_1$ and $\Delta nd_2$ of the reflection part Pr and transmission part Pt of each pixel Pix are set so that a phase difference of ¼ wavelength is provided between the ordinary light and extraordinary light of the transmission light in a field-free case, and the retardation is substantially 0 in a case where the electric field, in which the liquid crystal molecules substantially stand up and are arranged vertically to the surface of the substrates 2, and 3, is applied. Therefore, the light that enters the filed-free pixel wherein the liquid crystal molecules are in an initial arrangement, and enters the liquid crystal element 1, being converted to a circularly polarized light $L_{r2}$ by the front side retardation plate 17, is converted to a linearly polarized light $L_{r3}$, which is in the same polarizing state as the linearly polarized light $L_{r1}$, by being provided a phase difference of ¼ wavelength by the liquid crystal layer 4 of the field-free pixel, as shown in FIG. 1, and is reflected by the reflection film 8.

Additionally, among the light that transmits the field-free pixel and becomes a linearly polarized light $L_{r3}$, the light which transmits the transmission part Pt of the field-free pixel, though it will not be shown in the drawings, goes out to the back side of the liquid crystal element 1 and is converted to a circularly polarized light by the back side retardation plate 18. And among the circularly polarized lights, the polarization component parallel to the absorption axis of the back side polarization plate 16, is absorbed by the back side polarization plate 16, and the polarization component parallel to the transmission axis 16a of the back side polarization plate 16 transmits this back side polarization plate 16, and goes out to the back side. Therefore, the light transmitting the reflection part Pr does not concern the reflection display.

The linearly polarized light $L_{r3}$ which transmits the liquid crystal layer 4 in the reflection part Pr of the field-free pixel is reflected by the reflection film 8, and reenters the liquid crystal layer 4, is converted to a circularly polarized light $L_{r4}$, by this liquid crystal layer 4, is converted to a linearly polarized light $L_{r5}$ parallel to the transmission axis 15a of the front side polarization plate 15 by the retardation plate 17, and incidents in the front side polarization plate 15 from the back side, and goes out to the front side after transmitting this front side polarization plate 15.

Furthermore, among the light that is converted to a circularly polarized light $L_{r2}$ by the front side retardation plate 17, and enters the liquid crystal element 1, the light entering the electric field applied pixel (pixel in which the retardation became substantially 0), wherein the orientation of liquid crystal molecules are substantially arranged vertically to the surfaces of the substrates 2, and 3, as shown in FIG. 5B, the light transmitting through the liquid crystal layer 4 without the polarization state changing is reflected by the reflection film 8.

Additionally, the circularly polarized light $L_{r2}$, which transmitted through the electric filed applied pixel, though it is not shown in the drawings, goes out to the back side of the liquid crystal element 1, is converted to a linearly polarized light parallel to the absorption axis of the back side polarization plate 16 by the back side retardation plate 18, is absorbed by the back side polarization plate 16, and does not concern the reflection display.

The circularly polarized light $L_{r2}$ reflected by the reflection film 8 of the reflection part Pr of the electric field applied pixel, transmits the liquid crystal layer 4 as the circularly polarized light $Lr_2$ without changing the polarization situation, and goes out to the front side of the liquid crystal element 1, is converted to a linearly polarized light $L_{r6}$ which is orthogonal to the transmission axis 15a of the front side polarization plate 15 by the front side retardation plate 17, enters into the front side polarization plate 15 from the back side, and is absorbed by this front side polarization plate 15.

Namely, this liquid crystal display device carries out a reflection display of a normally white mode wherein the screen is bright in a field-free case in which electric field is not applied between the electrodes 5 and 6 of the liquid crystal element 1. A brightness of the screen is the brightest in a case where the twist arrangement of liquid crystal molecules of the liquid crystal element 1 is in an initial state, and is the darkest in a case where the orientations of the liquid crystal molecules are substantially perpendicular to the substrates 2 and 3.

According to this liquid crystal display device, among the lights entering the liquid crystal element 1 by transmitting the front side polarization plate 15 and the front side retardation plate 17, from the front side, which is the observer side of the display, the light that is reflected by the reflection film 8 of the reflection part Pr of the field-free pixel, wherein the liquid crystal molecules are arranged in an initial twist arrangement state, and goes out to the front side of the liquid crystal element 1, by re-transmitting the field-free pixel, is converted to a linearly polarized light $L_{r5}$ parallel to the transmission axis 15a of the front side polarization plate 15 by the front side retardation plate 17, and enters the front side polarization plate 15. By the light that transmitted the front side polarization plate 15, a bright screen is displayed. The light that is reflected by the reflection film 8 of the reflection part Pr of the filed-free pixel, wherein the liquid crystal molecules are arranged substantially perpendicular to the substrates 2 and 3, and goes out to the front side of the liquid crystal element 1, by re-transmitting the field-free pixel, is converted to a linearly polarized light $L_{r6}$ orthogonal to the transmission axis 15a of the front side polarization plate 15 by the front side retardation plate 17, and enters the front side polarization plate 15. By being absorbed by this front side polarization plate 15, a dark screen is displayed.

Therefore, this liquid crystal display device has enough brightness in the bright display by the field-free pixel of the liquid crystal element 1, and enough darkness in the dark display by the liquid crystal element 1, being able to display a reflection display of a high contrast.

Figure 6A:
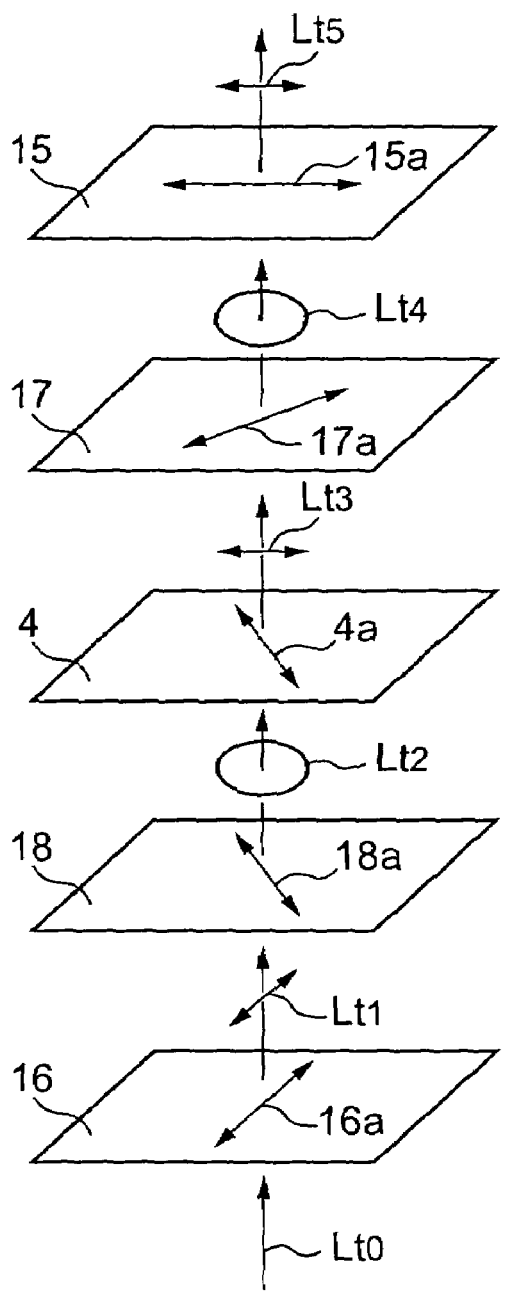
FIG. 6A and FIG. 6B are operation describing views in the transmission display of the liquid crystal display device in the first embodiment of the present invention.
Figure 6B:
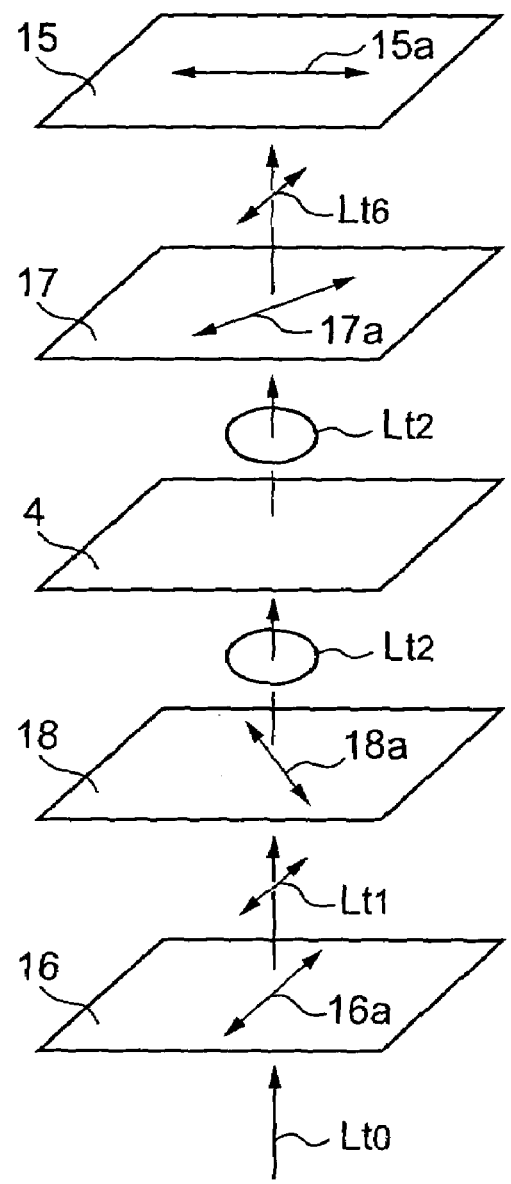

Next, transmission display using the illumination light from the surface light source 20 will be described. FIGS. 6A and 6B are views of the transmission display by the liquid crystal display device, and shows a part corresponding to the transmission part Pt of one of the pixel Pix of the liquid crystal element 1.

FIG. 6A shows a field-free case wherein the twist arrangement of the liquid crystal molecules of the liquid crystal layer 4 in the pixel Pix is in an initial state, and FIG. 6B shows an electric field applied case wherein the orientations of liquid crystal molecules are substantially vertical to the surfaces of the substrates 2, and 3.

This liquid crystal display device, in a transmission display case uses the back side polarization plate 16 placed behind the liquid crystal element 1, as the light polarizer, and the front side polarization plate 15 placed on the front side of the liquid crystal element 1 as the analyzer. In this liquid crystal display device, because the back side retardation plate 18, which provides a phase difference of ¼ wavelength between the ordinary light and extraordinary light of the transmission light, is placed between the liquid crystal element 1 and the back side polarization plate 16, the illumination light (un-polarized) that is emitted from the surface light source 20, and enters the back side polarization plate 16 from the back side of the plate, as shown in arrows in FIGS. 6A and B, is converted to a linearly polarized light $L_{t1}$ parallel to the transmission axis 16a by the back side polarization plate 16, and is converted to a circularly polarized light $L_{t2}$ by the back side retardation plate 18, and enters the liquid crystal element 1 from the back side.

Furthermore, among the lights that entered the liquid crystal element 1 from the back side, the light that entered the reflection part Pr of each pixel Pix of the liquid crystal element 1, is reflected to the back side by the reflection film 8, and does not concern the transmission display.

Then, among the light which is converted to a circularly polarized light $L_{t2}$ by the back side retardation plate 18, and enters the transmission part Pt of each pixel Pix of the liquid crystal element 1, the light that enters the field-free pixel wherein the twist arrangement of the liquid crystal molecules is in an initial state, as shown in FIG. 6A is provided a phase difference of ¼ wavelength by the liquid crystal layer 4 in the field-free pixel, and is converted to a linearly polarized light $L_{t3}$ orthogonal to the linearly polarized light $L_{t1}$ after transmitting the polarization plate 16, and goes out to the front side of the liquid crystal element 1, and is further converted to a circularly polarized light $L_{t4}$ by the front side retardation plate 17, and enters the front side polarization plate 15 from the back side. The light $L_{t5}$ which is a polarization component of the circularly polarized light $L_{t4}$, which is parallel to the transmission axis 15a of the front side polarization plate 15, transmits the front side polarization plate 15 and goes out to the front side.

Also, among the light that is converted to a circularly polarized light $L_{t2}$ by the back side retardation plate 18, and enters the transmission part Pt of each pixel Pix of the liquid crystal element 1, the light which entered the electric field applied pixel (pixel in which the retardation is substantially 0) wherein the orientations of the liquid crystal molecules are substantially orthogonal to the surface of the substrates 2 and 3, as shown in FIG. 6B, goes out to the front side of the liquid crystal element 1 after transmitting the electric field applied pixel as the circularly polarized light $L_{t2}$, without changing the polarization state, and further converted to a linearly polarized light $L_{t6}$ orthogonal to the transmission axis 15a of the front side polarization plate 15 by the front side polarization plate 17, and enters the front side polarization plate 15 from the back side, and is absorbed by this front side polarization plate 15.

Namely, this liquid crystal display device carries out a reflection display of a normally white mode wherein the screen is bright in a field-free case in which electric field is not applied between the electrodes 5 and 6 of the liquid crystal element 1. The display is the brightest in a case where the twist arrangement of liquid crystal molecules of the liquid crystal element 1 is in an initial state, and is the darkest in a case where the orientation of the liquid crystal molecules are substantially perpendicular to the substrates 2 and 3.

Therefore, this liquid crystal display device has enough brightness in the bright display using the field-free pixel of the liquid crystal element 1, and enough darkness in the dark display using the liquid crystal element 1, being able to display a transmission display of high contrast.

Additionally, the surface light source 20 may be applied as a supplementary light source in a case of reflection display using the external light, and in that case also, because both the reflection display and transmission display are in a normally white mode, a display of high contrast can be gained.

The liquid crystal display device displays a screen colored by the red, green, and blue color filters, 9R, 9G, and 9B, respectively corresponding to the plural pixels Pix, provided in the liquid crystal element 1, in the case of reflection display and transmission display.

Namely, this liquid crystal display device, in a case of reflection display, using external light, carries out a display using the light which enters the liquid crystal element 1 after transmitting the front side polarization plate 15 and front side retardation plate 17 from the front side, and is colored by the color filters 9R, 9G, and 9B, which respectively corresponds to the plural pixels Pix of the liquid crystal element 1, and is reflected by the reflection film 8 after transmitting through the liquid crystal layer 4 in the reflection parts Pr of the plural pixel Pix, and goes out to the front side after transmitting the front side polarization plate 15. Among the light which transmitted the retardation plate 17, a component parallel to the absorption axis of the front side polarization plate 15 is absorbed by the front side polarization plate 15, and a component parallel to the transmission axis 15a of the front side polarization plate 15 transmits through the polarization plate 15.

Furthermore, this liquid crystal display device, in a case of transmission display, using illumination light from the surface light source 20, carries out a display using the light which enters the liquid crystal element 1 after transmitting the back side polarization plate 16 and back side retardation plate 18 from the back side, and the light transmits the liquid crystal layer 4 of the transmission part Pt of the plural pixels Pix, in the liquid crystal element 1, and is colored by the color filters 9R, 9G, and 9B, and goes out to the front side of the liquid crystal element 1. Among the light that transmitted the front side retardation plate 17, the component parallel to the absorption axis of the front side polarization plate 15 is absorbed by the front side polarization plate 15, and the component parallel to the transmission axis 15a of the polarization plate 15 transmits through the polarization plate 15.

Therefore, the emitted light in the case of reflection display of this liquid crystal display device, is a colored light which transmitted by going to and from the color filters 9R, 9G, and 9B, and the emitted light in the case of transmission display, is a colored light that transmitted the color filters 9R, 9G, and 9B just once to one direction.

In this liquid crystal display device, as described above, because apertures 10 are formed partially on the parts corresponding to the reflection parts Pr of the color filters 9R, 9G, and 9B, a bright colored light is emitted from the reflection parts Pr of the plural pixels Pix in the liquid crystal element 1, in which colored lights, colored at the reflection parts Pr other than the parts of the apertures of the color filters 9R. 9G, and 9B, mixed to un-colored light that transmitted the apertures 10 of the aforementioned color filters 9R, 9G, and 9B.

Furthermore, in this liquid crystal display device, because the planarization transparent film 11 is formed filling the aperture 10 on the color filters 9R, 9G, and 9B, in the reflection parts Pr of the plural pixels Pix of the liquid crystal element 1, the difference of the liquid crystal layer thickness of the region corresponding to the part other than the apertures 10, and the liquid crystal layer thickness of the region corresponding to the apertures 10 is small, and the electro-optic characteristic of the liquid crystal layer 4 in the region corresponding to the reflection part Pr is approximately even throughout the whole region of the reflection part Pr, and in the case where it is field-free, both the colored light and the non-colored light emitted from the reflection part Pr can be controlled by the liquid crystal layer 4.

In this embodiment, as described above, the plurality of apertures 10 are formed in the parts corresponding to the reflection parts Pr of the color filters 9R, 9G, and 9B, and the ratio of the whole area of the plurality of apertures 10 to the whole area of the parts that correspond to the reflection parts Pr of the color filters 9R, 9G, and 9B are set so that the combined light of the colored light transmitted by going to and from the part corresponding to the reflection part Pr of the color filters 9R, 9G, and 9B, and the non-colored light has enough color purity and intensity.

According to this liquid crystal display device, the differences of the color purity and intensity of the emitted light in a case of reflection display and in a case of transmission display are small. Therefore a color image of a good quality at both the reflection display time and the transmission display time can be displayed.

Furthermore, in this embodiment, because the diffusion layer 19 is placed in between the liquid crystal element 1 and the front side retardation plate 15, external scenes such as the observer's face can not be seen being reflected on the reflection film 8, in a case of both the reflection display and the transmission display. Therefore, an image with higher quality can be displayed.

Second Embodiment

Figure 7:
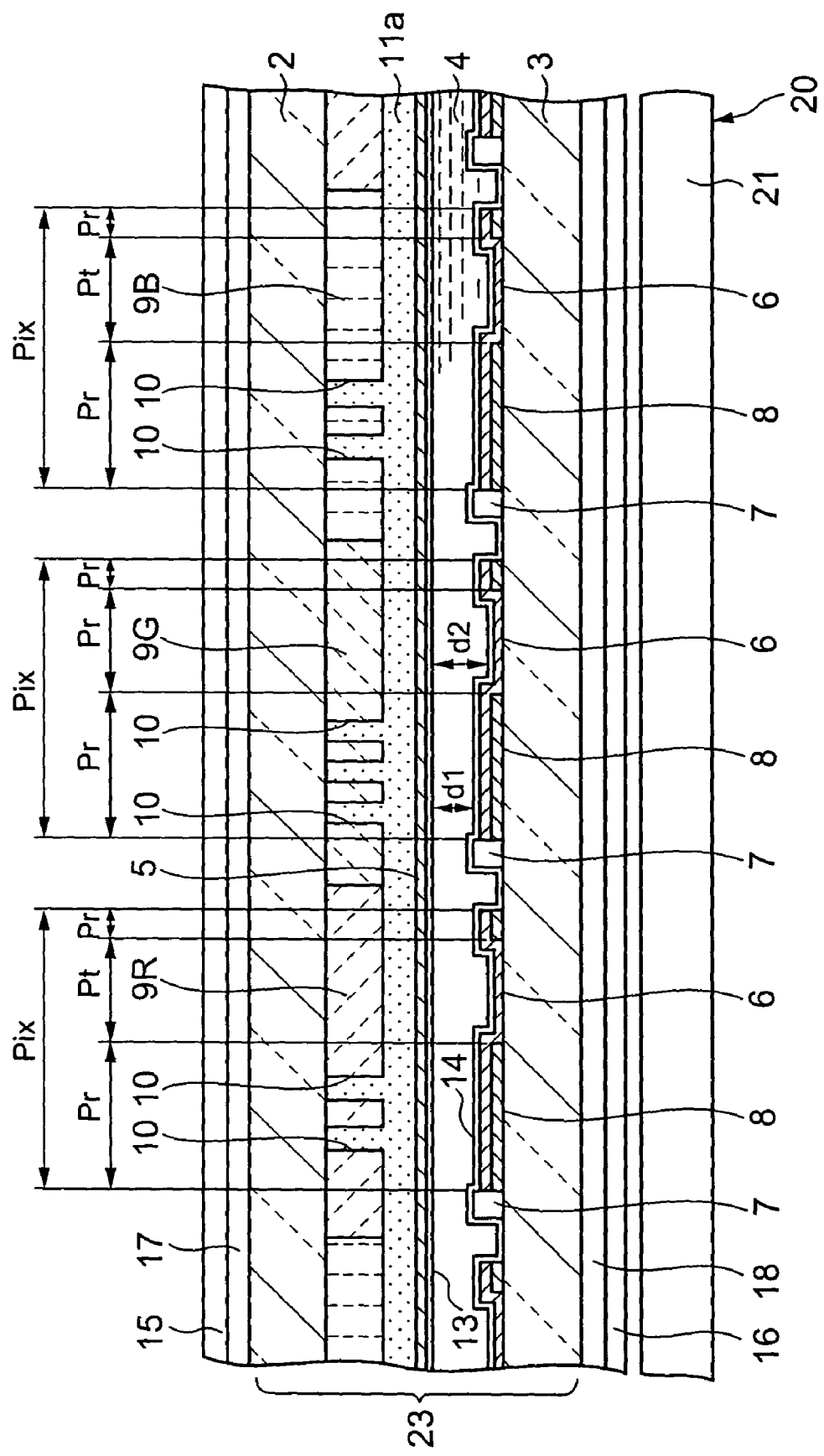
FIG. 7 is a cross sectional view of a part of the liquid crystal display device in the second embodiment of the present invention.

FIG. 7 is a cross sectional view showing a part of the liquid crystal display device in the second embodiment. In a liquid crystal element 23 of the liquid crystal display device of this embodiment, the diffusion layer 19 in between the liquid crystal element 1 and front side retardation plate 15, which is described in the first embodiment is omitted, and to prevent a reflection of external scenes such as the observer's face by the reflection film 8 of the liquid crystal element 23, a planarization transparent film 11a containing light diffusion particles is provided.

Furthermore, the structure of the liquid crystal display device of this embodiment is the same as the structure of the device of the first embodiment, except for the points that the diffusion layer 19 of the first embodiment is omitted, and the planarization transparent film 11, which is provided on the color filters 9R, 9G, and 9B of the liquid crystal element 1 includes light diffusion particles. Descriptions for the overlapping parts will be omitted by putting the same reference numerals on the drawings.

Third Embodiment

Figure 8:
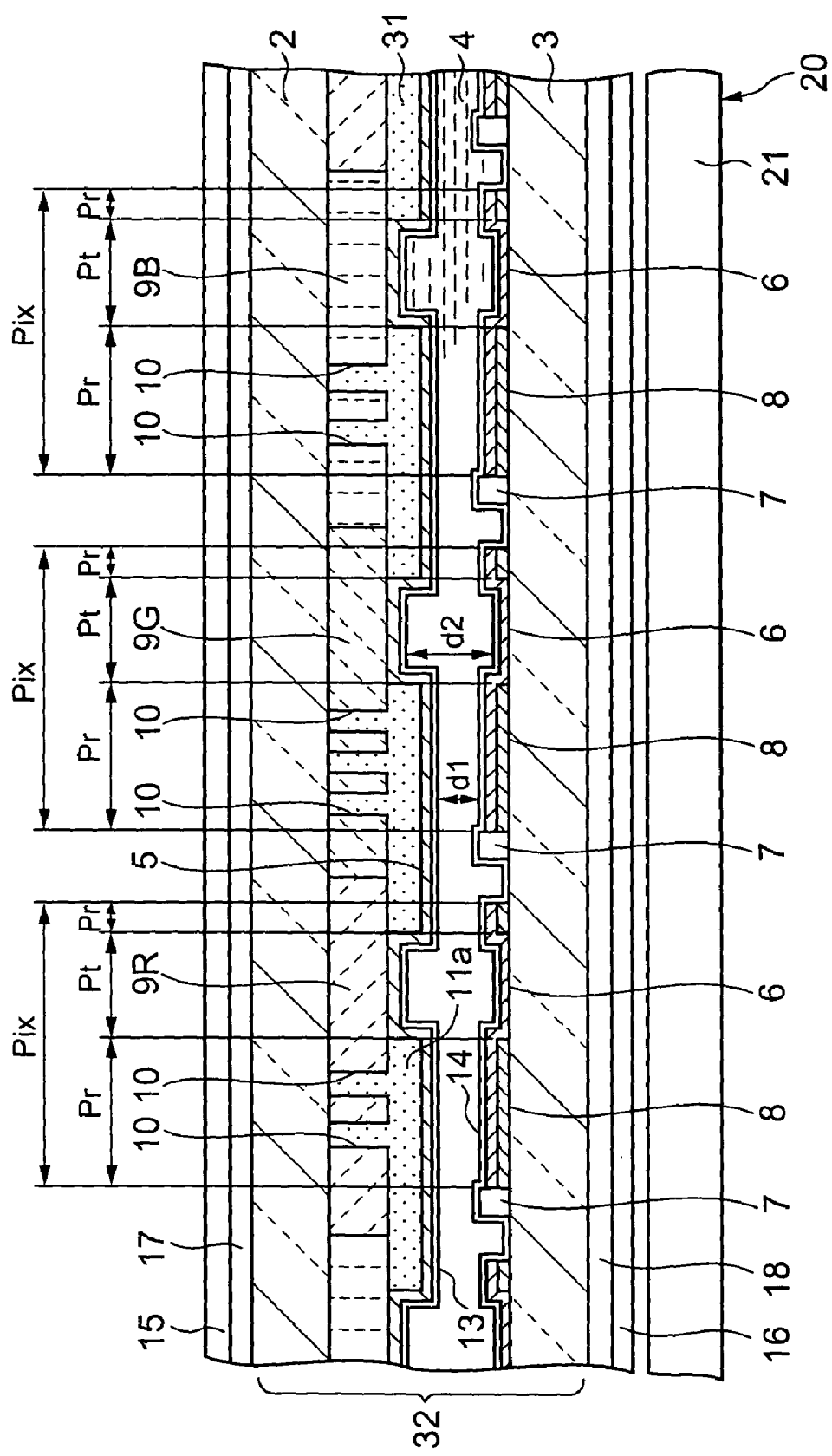
FIG. 8 is a cross sectional view of a part of the liquid crystal display device in the third embodiment of the present invention.

FIG. 8 is a cross sectional view showing a part of the liquid crystal display device of the third embodiment of the present invention. In a liquid crystal element 32 of the liquid crystal display device of this embodiment, the diffusion layer 19 of the first embodiment is omitted, and planarization transparent films 31 containing light diffusion particles are provided respectively in regions corresponding to the reflection parts Pr of the plural pixels Pix, excluding the parts corresponding to the transmission parts Pt of the plural pixels Pix, of the color filters 9R, 9G, and 9B provided on the inner surface of the front side substrate 2 of the liquid crystal element 32. The relation of the liquid crystal layer thickness $d_1$ in the reflection part Pr, and the liquid crystal layer thickness $d_2$ in the transmission part Pt of the each plural pixel Pix is $d_1 < d_2$.

In this embodiment, the twist angle Ø of the liquid crystal molecule arrangement of the liquid crystal layer 4, and the $\Delta nd_1$ are set so that a retardation provides a phase difference of ¼ wavelength between the ordinary light and the extraordinary light of the transmission light in a filed-free case wherein the liquid crystal molecule is in an initiate twist arrangement state, and the retardation is substantially zero in a case where the electric field wherein the orientations of the liquid crystal molecules are substantially vertical to the surface of the substrates 2 and 3, is applied. Also, the $\Delta nd_2$ is set so that a retardation provides a phase difference of ½ wavelength between the ordinary light and the extraordinary light of the transmission light in a filed-free case wherein the liquid crystal molecules are in an initiate twist arrangement state, and the retardation substantially turns to 0 in a case where the electric field, wherein the orientations of liquid crystal molecules are substantially vertical to the surface of the substrates 2 and 3, is applied.

It is preferable that the twist angle Ø of the liquid crystal molecule arrangement of the liquid crystal layer 4 is in the range of 60 degrees to 70 degrees, the value of the $\Delta nd_1$ in the reflection part Pr is in the range of 195±10 nm to 235±10 nm, and the value of the $\Delta nd_2$ in the transmission part Pt is in the range of 390±10 nm to 470±10 nm. By setting the values of the twist angle Ø of the liquid crystal molecule arrangement, and $\Delta nd_1$, $\Delta nd_2$ of the reflection part Pr and transmission part Pt within the ranges, the retardation of a ¼ wavelength can be provided to the reflection part Pr of the liquid crystal layer 4 in a field-free case, and the retardation of a ½ wavelength can be provided to the transmission part Pt of the liquid crystal layer 4 in a field-free case.

Because the structure of the liquid crystal display device of this embodiment is the same as the structure of the device of the first embodiment, except for the points that the diffusion layer 19 of the first embodiment is omitted, and a planarization transparent film 11 containing light diffusion particles is provided, on the color filters 9R, 9G, and 9B of the liquid crystal element 1, and the value of the $\Delta nd_1$ in the reflection part Pr, and $\Delta nd_2$ in the transmission part Pt, of the each pixel Pix of the liquid crystal element 32, are different from each other. Descriptions for the overlapping parts will be omitted by putting the same reference numerals on the drawings.

The liquid crystal display device of this embodiment also carries out reflection display using the reflection parts Pr of the plural pixels Pix of the liquid crystal element 32, and carries out the transmission display using the transmission parts Pt of the plural pixels Pix of the liquid crystal element 32. The reflection display is the same as the reflection display carried out by the liquid crystal display device of the first embodiment. The operation in a case where electric field is applied, wherein the liquid crystal molecules are arranged substantially orthogonal to the surfaces of the substrates 2 and 3, is the same transmission display shown in FIG. 6B of the first embodiment. Therefore, the same operation descriptions will be omitted.

Figure 9:
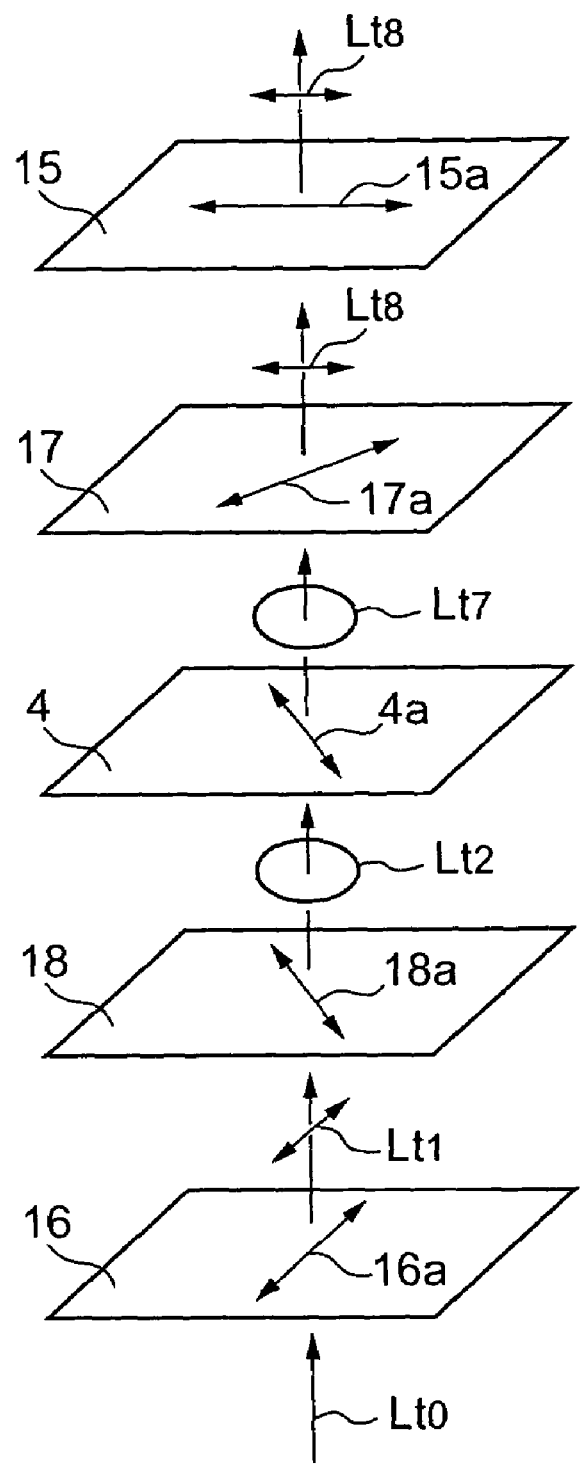
FIG. 9 is an operation describing view in the transmission display of the liquid crystal display device in the third embodiment of the present invention.

FIG. 9 is a view showing the operation of the transmission display of the liquid crystal display device of this embodiment, and shows the display in the part corresponding to the transmission part Pt of one pixel Pix of the liquid crystal element 32. FIG. 9 shows a field-free case, wherein the twist arrangement of the liquid crystal molecules of the liquid crystal layer 4 of the pixel Pix is in an initial state.

In a case where this transmission display is carried out, the illumination light $L_{t0}$ (not polarized) that is emitted from the surface light source 20, as shown in arrow in FIG. 9, and enters the back side polarization plate 16 from the back side, is converted to a linearly polarized light $L_{t1}$ that is parallel to the transmission axis 16a by the back side polarization plate 16, and is converted to a circularly polarized light $L_{t2}$ by the back side retardation plate 18, and enters the liquid crystal element 32 from the back side. Among those lights entering the liquid crystal element 32, the light that entered the transmission part Pt of each pixel Pix of the liquid crystal element 32, enters the liquid crystal layer 4.

The light that is converted to a circularly polarized light $L_{t2}$ by the back side retardation plate 18, and enters into the transmission part Pt of each pixel Pix, as shown in FIG. 9, is provided a phase difference of ½ wavelength by the liquid crystal layer 4 of the field-free pixel, goes out the front side of the liquid crystal element 32 as a circularly polarized light $L_{t7}$ and is converted to a linearly polarized light $L_{t8}$ parallel to the transmission axis 15a of the front side polarization plate 15 by the front side retardation plate 17, and enter into the front side polarization plate 15 from the back side, transmits this front side polarization plate 15, and goes out from the front side of the liquid crystal display device.

Namely, the liquid crystal display device of this embodiment, carries out the reflection display of the same normally white mode as the liquid crystal display device of the first embodiment, and the transmission display of a normally white mode as shown in FIG. 9 and FIG. 6B, and the display is carried out with enough brightness, and high contrast in both the case of reflection display and transmission display.

In the liquid crystal display device of the first embodiment, in the transmission display, the light that transmits the field-free pixel of the liquid crystal element 1, is converted to a circularly polarized light $L_{r4}$ by the front side retardation plate 16, as shown in FIG. 6A, and among the circularly polarized light $L_{r4}$, the light $L_{r5}$ with a polarization component parallel to the transmission axis 15a of the polarization plate 15, transmits this front side polarization plate 15 and goes out to the front side, resultantly a bright screen is displayed. On the other hand, in the liquid crystal display device of the third embodiment, in the case of transmission display, the circularly polarized light $L_{r7}$ that transmits the field-free pixel of the liquid crystal element 32, as shown in FIG. 9 is converted to a linearly polarized light $L_{r8}$ parallel to the transmission axis 15a of the front side polarization plate 15 by the front side retardation plate 17, enters the front side polarization plate 15, transmits the front side polarization plate 15 and goes out to the front side of the liquid crystal display device. Therefore, because almost every circularly polarized light $L_{r7}$ transmits the front side polarization plate 15, the bright screen in a case of transmission display can be brighter and have a higher contrast than the screen in a case of the bright display by the liquid crystal display device of the first embodiment.

In the liquid crystal display device of this embodiment also, because a plurality of color filters 9R, 9G, and 9B having a plurality of apertures 10, respectively corresponding to the plural pixel Pix, are provided to the parts corresponding to the reflection parts Pr of the pixels Pix, and the planarization transparent films 31 are formed on the parts corresponding to the reflection parts Pr of the color filters 9R, 9G, and 9B, filling the interior of the apertures, a color image of good quality can be displayed in the case of reflection display and transmission display.

Furthermore, in the liquid crystal display devices of the second and third embodiment, the planarization transparent film 31, containing light diffusion particles, is provided at the whole region of the reflection parts Pr of the plural pixels Pix, excluding the parts that correspond to the transmission parts Pt of the plural pixels Pix, on the color filters 9R, 9G, and 9B of the liquid crystal elements 23 and 32, and the phenomenon of the reflection of external scenes is prevented by the planarization transparent film 31. Therefore, the emitted light to the front side in a case of transmission display, using the transmission parts Pt of the plural pixels Pix of the liquid crystal element 32, is not diffused, resulting to the display image at the transmission display time being a high quality image without unclearness caused by the diffusion of light.

In the first to third embodiments, the liquid crystal molecules of the liquid crystal layers 4 of the liquid crystal elements 1, 23, or 32 are arranged in a twist angle Ø of 64 degrees counter clock-wise looking from the front side of the direction from the back side substrate 3 to the front side substrate 2. But it may be that in the liquid crystal elements 1, 23, and 32, the orientations 3a of the liquid crystal molecules near the back side substrate 3 may be set 64 degrees clock-wise looking from the front side to orientations 2a of the liquid crystal molecules near the front side substrate 2, and the liquid crystal molecules are arranged in a twist angle Ø of 64 degrees counter clock-wise looking from the front side in the direction from the back side substrate 3 to the front side substrate 2, and the slow axis 4a of the liquid crystal layer 4 may be set 45 degrees counter clock-wise looking from the front side (the opposite direction to the twist direction of the liquid crystal molecule) to the orientations 2a of the liquid crystal molecules near the front side substrate 2.

Furthermore, in the above embodiments, the front side polarization plate 15 is placed so that its transmission axis 15a is 45 degrees counter clock-wise looking from the front side to the slow axis 4a of the liquid crystal layer 4 of the liquid crystal element 1, 23, or 32, but the front side polarization plate 15 may be so that the transmission axis 15a is placed 45 degrees clock-wise looking from the front side to the slow axis 4a of the liquid crystal layer 4 of the liquid crystal element 1, and the back side polarization plate 16 may be placed so that the transmission axis 16a is orthogonal to the transmission axis 15a of the front side polarization plate 15.

Additionally, in the above embodiment, the front side retardation plate 17 is placed so that the slow axis 17a is 45 degrees counter clock-wise looking from the front side to the transmission axis 15a of the front side polarization plate 15. But the front side retardation plate 17 may be placed so that the slow axis 17a is 45 degrees counter clock-wise looking from the front side to the slow axis 15a to the front side polarization plate 15, and the back side retardation plate 18 may be placed so that the slow axis 18a is orthogonal to the slow axis 17a of the front side retardation plate 17.

In the liquid crystal display devices of the aforementioned embodiments, the incident light is converted from a circularly polarized light to a linearly polarized light, or from a linearly polarized light to a circularly polarized light by λ/4 retardation plates 17 and 18, and liquid crystal layers 4 of the liquid crystal element 1, 23, or 32, in a case of both the reflection display and transmission display. However, in the case of reflection display, the incident light may be converted to a circularly polarized light and linearly polarized light, and in the case of transmission display time, the incident light may be converted to a light in another polarization state.

In that case, the λ/4 retardation plate 18, placed in the back side is omitted, and the value of the $\Delta nd_2$ of the transmission part Pt of the each pixel Pix of the liquid crystal elements 1, 23, and 32, and the direction of the transmission axis 16a of the back side polarization plate 16 are set so that in a field-free case, the linearly polarized light that transmits the back side polarization plate 16, and enters the liquid crystal element is converted by the liquid crystal layer 4 and the front side retardation plate 17 to polarized light that transmits the front side polarization plate 15, in a case where electric field wherein the liquid crystal molecules are arranged substantially orthogonal to the surfaces of the substrates 2, and 3, is applied, and the retardation of the liquid crystal layer 4 substantially becomes zero, the linearly polarized light that transmits the back side polarization plate 16, and enters the liquid crystal element is converted to polarized light that is absorbed by the front side polarization plate 15 by the front side retardation plate 17. Additionally, in this case, a retardation plate (a retardation plate other than the λ/4 retardation plate) to compensate contrast of the transmission display may be placed between the liquid crystal elements 1, 23, or 32, and the back side polarization plate 16.

Furthermore, in both the reflection display and the transmission display, the incident light may be converted to a light of another polarization state. In that case, the front and back λ/4 retardation plates 17 and 18 are omitted, and the arrangement of the liquid crystal molecules of the liquid crystal layer 4 of the liquid crystal element 1, 23, or 32, the values of the $\Delta nd_1$ and $\Delta nd_2$ of the reflection part Pr and the transmission part Pt of the each pixel Pix of the each liquid crystal element 1, 23, or 32, the direction of the transmission axis 15a, 16a of the front and back polarization plates 15, 16 are set so that in a field-free case, the linearly polarized light that transmits either the front or back polarization plate 15, 16, and enters the liquid crystal element is converted by the liquid crystal layer 4 to polarized light that transmits the other polarization plate, and in a case where electric field wherein the liquid crystal molecules are arranged substantially orthogonal to the surfaces of the substrates 2, and 3, is applied, and the retardation of the liquid crystal layer 4 substantially becomes zero, the linearly polarized light that transmits one polarization plate 15 or 16 and enters the liquid crystal element is converted to a light that is absorbed by the other polarization plate 15 or 16.

In that case, the arrangement type of the liquid crystal molecules of the liquid crystal layer of the liquid crystal elements 1, 23, or 32, may be a TN-type with a twist angle of approximately 90 degrees, or STN-type with a twist angle of approximately 230 degrees to 270 degrees. Other than the twist type, arrangement types such as a homogeneous arrangement wherein long axes of the liquid crystal molecules are arranged in one direction, is available. Furthermore, a retardation plate to compensate the contrast of the display may be placed in between the liquid crystal elements 1, 23, or 32, and the front side polarization plate 15, or in between the liquid crystal elements 1, 23, or 32, and both the front and back polarization plates 15, and 16.

In this way, in a case where the arrangement type of the liquid crystal molecules of the liquid crystal layer 4 of the liquid crystal element 1, is a twist type of approximately 90 degrees, or 230 degrees to 270 degrees, or a homogeneous type, the relation of the liquid crystal layer thickness $d_1$ and $d_2$ of the reflection part Pr and transmission part Pt of the each pixel Pix of the liquid crystal element 1, 23, or 32 may be $d_1 \approx d_2$, but it is preferable to set the relation to $d_1 < d_2$. By doing so, the difference of the display characteristic in a case of reflection display and the display characteristic in a case of transmission display can be made smaller.

Namely, in this liquid crystal display device, in a case of reflection display, the light that enters the transmission parts Pr of the pixels Pix from the front side of the liquid crystal element 1, 23, or 32, goes to and from, transmitting the liquid crystal layer 4 and goes out to the front side of the liquid crystal element 1, 23, or 32, undergoes a retardation having a value corresponding to a value twice as much as the $\Delta nd_1$ of the liquid crystal layer 4 in the reflection part Pr, and in a case of transmission display, the light that enters the reflection parts Pr of the pixels Pix from the back side of the liquid crystal element 1, 23, or 32, transmits the liquid crystal layer 4 to one direction and goes out to the front side of the liquid crystal element, undergoes a retardation having a value corresponding to the value of $\Delta nd_2$ of the liquid crystal layer 4 of the transmission part Pt.

However, if the relation of the liquid crystal layer thickness $d_1$ and $d_2$ of the reflection part Pr and transmission part Pt of the each pixel Pix of the liquid crystal element 1, 23, or 32 is $d_1 < d_2$, the difference of the display characteristic in the case of reflection display and in the case of transmission display can be made smaller.

It is preferable that the liquid crystal layer thickness $d_1$ and $d_2$ of the reflection part Pr and transmission part Pt of the each pixel Pix of the liquid crystal elements 1, 23, or 32 is set so that the liquid crystal layer thickness $d_2$ of the transmission part Pt is thicker than the liquid crystal layer thickness $d_1$ of the reflection part Pr by 0.5 to 6 μm, namely $d_2 = 2.5$ to 10 μm, in a case where for example the liquid crystal layer thickness $d_1$ of the reflection part Pr is 2 to 4 μm.

In the above embodiments, the region approximately half of the central part and rim part of the each pixel Pix, is the reflection part Pr, and the region approximately half of the other region of the central part of the each pixel Pix, is the transmission part Pt. But the area ratios and shapes of the reflection part Pr and transmission part Pt may be formed arbitrarily. Furthermore, either the reflection part Pr or the transmission part Pt, or both the reflection part Pr and transmission part Pt, may be plurally formed in one pixel Pix.

In the above embodiments, a plurality of apertures 10 are each formed on the parts corresponding to the reflection part Pr of the red, green, and blue color filters, 9R, 9G, and 9B of the liquid crystal element 1, 23, or 32. But one aperture having an area corresponding to the whole area of the plural apertures 10, may be formed in the part corresponding to the reflection part Pr of the each color filters 9R, 9B, and 9G. In that case also, by forming planarization transparent film 11 or 11a, filling the interior of the aperture, on the part at least corresponding to the reflection part Pr of the each color filters 9R, 9G, and 9B, the difference between the liquid crystal layer thickness in the region that corresponds to the parts other than the apertures of the color filters 9R, 9G, and 9B, and the liquid crystal layer thickness in the region corresponding to the aperture is made smaller, the electro-optic characteristic of the liquid crystal layer 4 in the region corresponding to the reflection part Pr, is made approximately even within the whole region of the reflection part Pr, and both the colored light and non colored light can be emitted from the reflection part Pr, at a high emitting rate.

Furthermore, in the above embodiments, the reflection film 8 for forming the reflection part Pr is provided on the inner surface of the back side substrate 3 of the liquid crystal element 1, 23, or 32. However, the part corresponding to the reflection part Pr of the electrode 6 can be formed by a metal film, and the part corresponding to the reflection part Pr of the electrode 6 can be combined as a reflection film, and furthermore, the reflection film 8 may be provided for example on the exterior surface of the back side substrate 3, as long as it is behind the liquid crystal layer 4.

The color filters 9R, 9G, and 9B, and the planarization transparent films 11, 11a, and 31 may be provided on the inner surface of the front side substrate 2 of the liquid crystal element 1, 23, or 32, and the liquid crystal element 1, 23, or 32 is not limited to the active matrix liquid crystal, and can be simple matrix liquid crystal.

Fourth Embodiment

Figure 10:
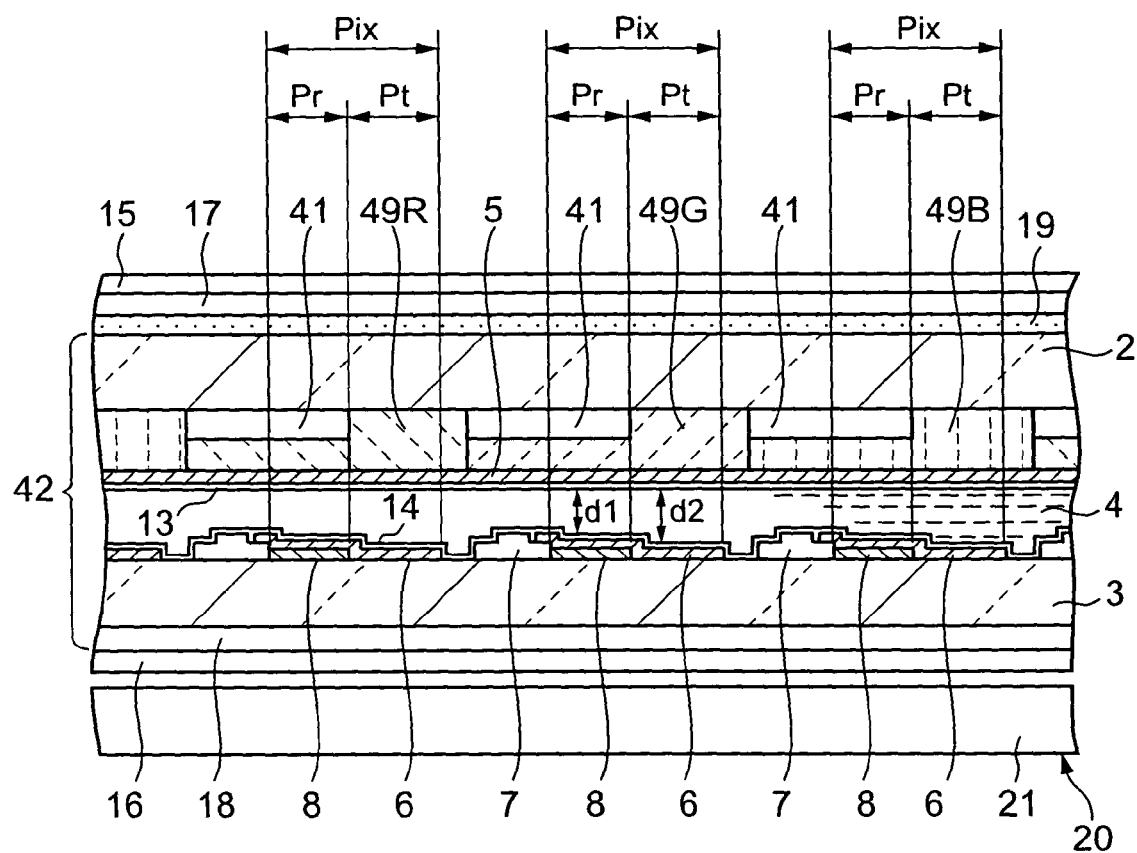
FIG. 10 is a cross sectional view of a part of the liquid crystal display device in the fourth embodiment of the present invention.

FIG. 10 is a cross sectional view showing a part of the liquid crystal display device of the fourth embodiment of the present invention. A color filter and a transparent component of the liquid crystal display device of this embodiment, have different structures from the structures of the color filter and the transparent component in the first embodiment, and as for the same members, the same reference numerals are applied, and the descriptions are omitted.

On the inner surface of either the front side substrate 2 or the back side substrate 3, included in a liquid crystal element 42 of the fourth embodiment, for example on the inner surface of the front side substrate 2, a plurality of transparent non-colored films 41 are provided in the whole reflection parts Pr of the plural pixels Pix. In the regions corresponding to the pixels Pix, of the inner surface of the front side substrate 2, a plurality of color filters 49R, 49G, and 49B of for example the colors of red, green, and blue are provided. The parts respectively corresponding to reflection parts Pr of the color filters 49R, 49G, and 49B are formed on the non-colored film 41. Furthermore, the non-colored film 41, and color filters 49R, 49G, and 49B are formed on the substrate surface of the front side substrate 2, and the common electrode 5 is formed on top thereof.

Each of the red, green, and blue color filter 49R, 49G, and 49B is formed in a film thickness ratio in which the film thickness of the part that is piled on the non-colored film 41, namely the film thickness of the part that corresponds to the reflection part Pr, is smaller than the film thickness of the part corresponding to the transmission part Pt.

Furthermore, a value of the film thickness of these color filters 49R, 49G, and 49B, in the parts corresponding to the reflection part Pr is set to a value so that the light that enters the reflection part Pr from the front side, and exits to the front side, namely the light that goes to and from transmitting the parts corresponding to the parts of the color filters 49R, 49G, and 49B, goes out as a colored light that has enough color purity and intensity, and a value of the film thickness of the parts corresponding to the transmission part Pt, is set to a value so that the light that enters the transmission part Pt from the back side and exits to the front side transmitting the transmission part Pt, namely the light that transmits the parts corresponding to the transmission part Pt of the color filters 49R, 49G, and 49B to one direction, goes out as a light that has enough color purity and intensity.

The non-colored film 41 is formed in a film thickness corresponding to the film thickness difference between the part corresponding to the transmission part Pt and the part corresponding to the reflection part Pr of each color filters 49R, 49G, and 49B. Therefore, the surface of the color filters 49R, 49G, and 49B (the forming surface of the common electrode 5), is even throughout the reflection part Pr to the transmission part Pt.

Furthermore, the non-colored film 41 is formed by organic films such as for example photoresist, or inorganic films such as ITO. The color filters 49R, 49G, and 49B are formed by firstly forming a first color resist layer having the same film thickness as the non-colored film 41 in the part corresponding to the transmission part Pt of the front side substrate 2, and then forming a second color resist layer having the same color as the first color resist layer, on the non-colored film 41 and first color resist layer.

Additionally, the front side substrate 2 and back side substrate 3 are connected through a seal member, which surrounds the display area that the plural pixels are arranged in a matrix form, and liquid crystal layer 4 is formed by filling Nematic liquid crystal having a plus anisotropic dielectric in the area surrounded by the seal in between the substrates 2 and 3.

Furthermore, on surfaces contacting the liquid crystal layer 4 of the front side substrate 2 and the back side substrate 3, an alignment film 13, and 14 are arranged respectively. The orientations of the liquid crystal molecules close to the substrates 2 and 3 of the liquid crystal layer 4, are defined by the alignment film 13, and 14, and the liquid crystal molecules are arranged at a predetermined twist angle Ø between the front and back substrates 2 and 3.

In this embodiment, in a case where the liquid crystal layer thickness in the reflection part Pr of each pixel Pix of the liquid crystal element 42, is $d_1$ and the liquid crystal layer thickness in the transmission part Pt of the pixel Pix of the liquid crystal element is $d_2$, the liquid crystal layer thickness $d_1$ and $d_2$ is set so that it is $d_1 \approx d_2$. The value of the twist angle Ø of the liquid crystal molecule arrangement of the liquid crystal layer 4, and the value of Δnd, multiplying anisotropic refractive index An of liquid crystal in the reflection part Pr and the transmission part Pt of the each pixels Pix, to the liquid crystal layer thickness d (hereinafter the Δnd of the reflection part is described as $\Delta nd_1$, and the transmission part is described as $\Delta nd_2$) are set so that a retardation that provides a phase difference of ¼ wavelength (approximately 140 nm) between the ordinary light and the extraordinary light, included in the light transmitting the liquid crystal element 42, in a case where the liquid crystal molecules are in an initiate twist arrangement state in a field-free case, in which an electric field is not applied, and the retardation substantially turns to zero in a case where the electric field wherein liquid crystal molecules substantially orient vertically to the surface of the substrates 2 and 3, is applied between the electrodes 5 and 6.

It is preferable that the twist angle Ø of the liquid crystal molecule arrangement of the liquid crystal layer 4 is in the range of 60 degrees to 70 degrees, and the value of the $\Delta nd_1$ of the reflection part Pr of the plural pixels Pix, and the value of the $\Delta nd_2$ of the transmission part Pt are 195±10 nm to 235±10 nm. By setting the values of the twist angle Ø of the liquid crystal arrangement and the values of $\Delta nd_1$, $\Delta nd_2$ in the above ranges, a retardation of a ¼ wavelength can be provided to the liquid crystal layer 4 in a field-free case.

In this embodiment, the twist angle Ø of the liquid crystal molecule arrangement is set to 64 degrees, and the values of $\Delta nd_1$ and $\Delta nd_2$ of the reflection part Pr and transmission part Pt of the each pixel Pix, are set at 195+10 nm, and the liquid crystal layer 4 is provided with a retardation of ¼ wavelength in a field-free case.

In this embodiment, as shown in FIG. 1, the front side retardation plate 17 is placed so that its slow axis 17a is placed 45 degree counter clock-wise looking from the front side, to the horizontal axis x of the screen parallel to the transmission axis 14a of the front side polarization plate 14, and the back side retardation plate 17 is placed so that its slow axis 17a is placed in a 135 degree counter clock-wise, looking from the front side, to the horizontal axis x of the screen.

Additionally, the diffusion layer 18 placed between the liquid crystal element 42 and the front side retardation plate 16, is a forward diffusion layer which diffuses the light coming from one surface, and emits the light from the other surface. This diffusion layer 18 is comprised of adhesive containing light diffusion particles, or of transparent resin film.

This liquid crystal display device, as recited in the first embodiment, carries out the reflection display using the reflection parts Pr of the plural pixels Pix of the liquid crystal element 42, and carries out the transmission display using the transmission parts Pt of the plural pixels of the liquid crystal element 42.

Namely, this liquid crystal display device carries out a reflection display of a normally white mode wherein the screen is bright in a field-free case in which electric field is not applied between the electrodes 5 and 6 of the liquid crystal element 42. A brightness of the screen is the brightest in a case where the twist arrangement of liquid crystal molecules of the liquid crystal element 42 is in an initial state, and is the darkest in a case where the orientations of the liquid crystal molecules are substantially perpendicular to the substrates 2 and 3.

In this liquid crystal display device, the emitted light in the case of the reflection display is a colored light that transmits the color filters 49R, 49G, and 49B, and goes to and from thereof, and the emitted light in the case of the transmission display is a colored light that transmitted the color filters 49R, 49G, and 49B, once to one direction. As mentioned above, a plurality of non-colored films 41 corresponding to the reflection parts Pr of the plural pixels Pix are provided on the inner surface of the front side substrate 2 of the liquid crystal element 42 to realize the high transmission ratio of the lights transmitting the color filters 49R, 49G, and 49B, of the reflection parts Pr of the plural pixels Pix, and the color filters 49R, 49G, and 49B of the red, green, and blue color filters that respectively correspond to the plural pixels Pix, in the parts corresponding to the reflection parts Pr, are piled on the non-colored films 9, in the film thickness ratio of the film thickness in the part corresponding to the reflection part Pr is smaller the film thickness of the part corresponding to the transmission part Pt. Therefore, the transmission rate of the light that enters the color filters 49R, 49G, and 49B of the reflection part Pr is high, the differences of the color purity and intensity of the emitted light in a case where the reflection display and transmission display are made smaller, and a good quality color image can be displayed at both the reflection display and transmission display.

In this embodiment, as described above, the value of the film thickness in the parts corresponding to the reflection parts Pr of the color filters 49R, 49G, and 49B, is set so that the light which enters the reflection part Pr from the front side, and exits to the front side after being reflected by the reflection film 8, goes out as light with enough color purity and brightness, and the value of the film thickness in the part corresponding to the transmission part Pt, is set so that the light which enters the transmission part Pt from the back side, and goes out to the front side transmitting the transmission part Pt, goes out as light with enough color purity and brightness.

Fifth Embodiment

Figure 11:
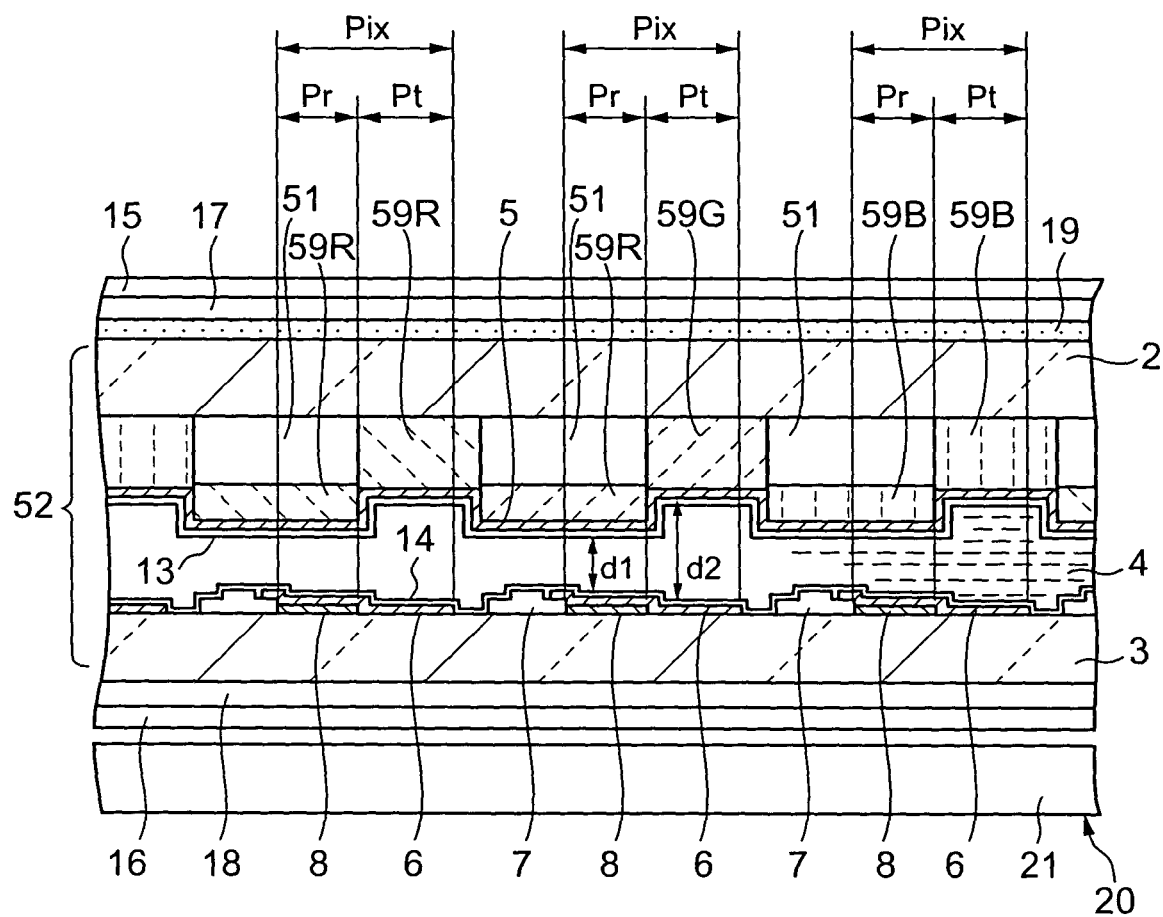
FIG. 11 is a cross sectional view of a part of the liquid crystal display device in the fifth embodiment of the present invention.

FIG. 11 is a cross-sectional view showing a part of a liquid crystal display device of the fifth embodiment of the present invention. In the liquid crystal display device of this embodiment, thickness of a non-colored film 51, provided on the inner surface of the front side substrate 2 of the liquid crystal element 52, and is thicker than that of the first embodiment, and the relation of the liquid crystal layer thickness d, of the reflection part Pr and the liquid crystal layer thickness $d_2$ of the transmission part Pt of the plural pixels Pix is set to $d_1 < d_2$. In this embodiment also, the color filters 59R, 59G, and 59B placed on the inner surface of the front side substrate 2 of the liquid crystal element 52 is formed so that the parts corresponding to the reflection parts Pr are provided on the non-colored film 50, and their film thickness of the parts corresponding to the reflection parts Pr is thinner than the parts corresponding to the transmission parts Pt.

In this embodiment, the twist angle Ø of the liquid crystal molecule arrangement of the liquid crystal layer 4 of the liquid crystal element 52, and the value of the $\Delta nd_1$ of the reflection parts Pr of the plural pixels Pix, are set so that a retardation that provides a phase difference of ¼ wavelength between the ordinary light and the extraordinary light of the transmission light in a case where the liquid crystal molecules is arranged in an initiate arrangement state in a field-free case, and the retardation substantially turns to zero in a case where the electric field, by which liquid crystal molecules are substantially arranged vertically to the surfaces of the substrates 2 and 3, is applied, and at the same time, the value of $\Delta nd_2$ of the transmission parts Pt of the plural pixels Pix is set so that a retardation that provides a phase difference of ½ wavelength between the ordinary light and the extraordinary light of the transmission light in a case where the liquid crystal molecule are in an initiate twist arrangement in a field-free case is realized, and the retardation substantially turns to zero in a case where the electric field, by which liquid crystal molecules are substantially arranged vertical to the surfaces of the substrates 2 and 3, is applied.

Furthermore, in the liquid crystal display device of this embodiment, points that the relation of the liquid crystal layer thickness $d_1$, and $d_2$ of the reflection part Pr and transmission part Pt of the each pixel Pix of the liquid crystal element 52, is $d_1 < d_2$, and the values of the $\Delta nd_1$ of the reflection part Pr, and the $\Delta nd_2$ of the transmission part Pt differ respectively from the first embodiment. Because the other structures are the same as the structures of the first embodiment, descriptions for the overlapping parts will be omitted by putting the same reference numerals on the drawings.

The liquid crystal display device of this embodiment is also a device that carries out reflection display using the reflection parts Pr of the plural pixels Pix of the liquid crystal element 53, and carries out transmission display using the transmission parts Pt of the plural pixels Pix of the liquid crystal element 53. As is the case with the above mentioned third embodiment, the liquid crystal display device of this embodiment carries out both the reflection display and the transmission display.

Furthermore, in the liquid crystal display device of this embodiment, a plurality of non-colored films 51 corresponding to the reflection parts Pr of the plural pixels Pix are provided on the inner surface of the front side substrate 2 of the liquid crystal element 52 and each of the color filters 59R, 59G, and 59B has the film thickness as described above. By this, the differences of the color purity and intensity of the emitted light at the reflection display time and transmission display time can be made smaller, and it is possible to display a good quality color image at both the reflection display time and transmission display time.

In the above mentioned fourth embodiment and fifth embodiment, the diffusion layer 18 placed between the liquid crystal elements 42, 52, and the front side retardation plate 17 may be omitted, and the non-colored films 41, 51 provided each corresponding to the reflection parts Pr of the plural pixels Pix in the inner surface of the front side substrate 2 of the liquid crystal elements 42, 52, may include light diffusion particles. By doing so, the non-colored film has a characteristic to diffuse light. By this, the phenomenon of external scenes such as the display observer's face being seen reflected on the reflection film 8 of the liquid crystal element 1, can be prevented.

Sixth Embodiment

Figure 12:
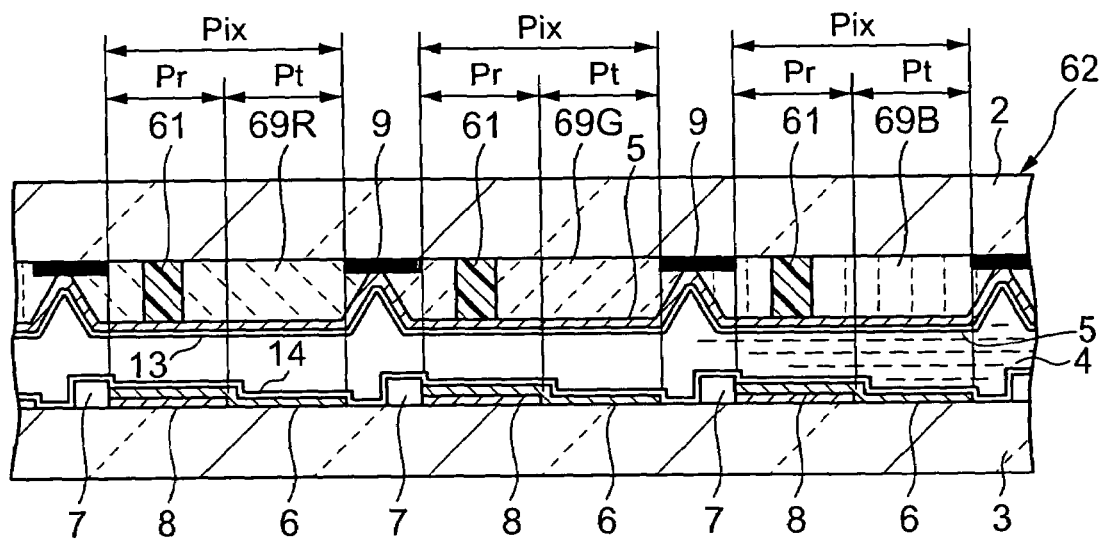
FIG. 12 is a part of the element in the sixth embodiment of the present invention.
Figure 13:
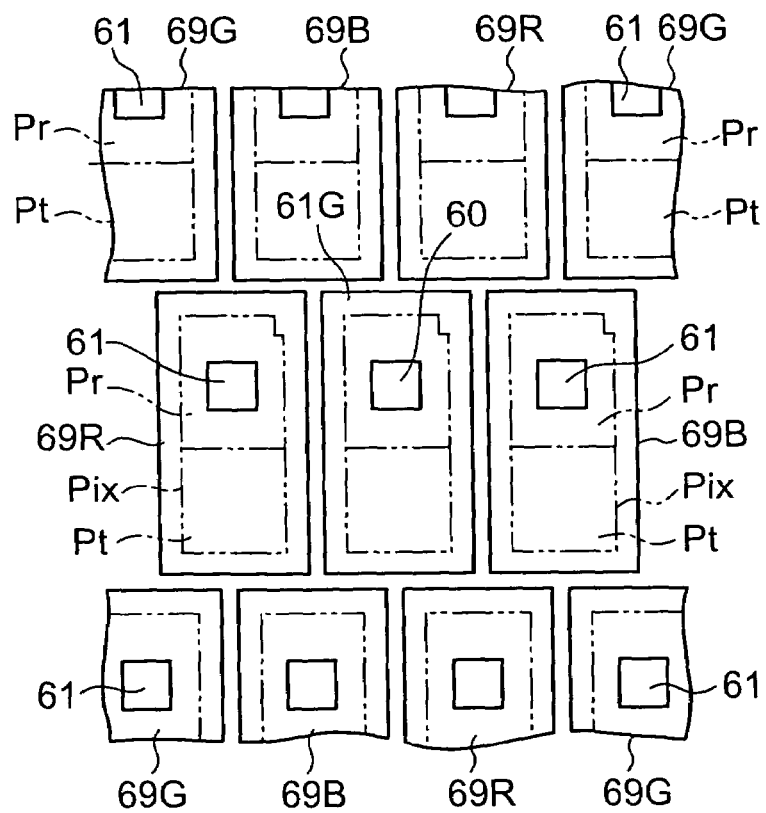
FIG. 13 is a plane view of the plural pixels and non-colored layer, and color filter of the liquid crystal display device in the sixth embodiment of the present invention.
Figure 14A:
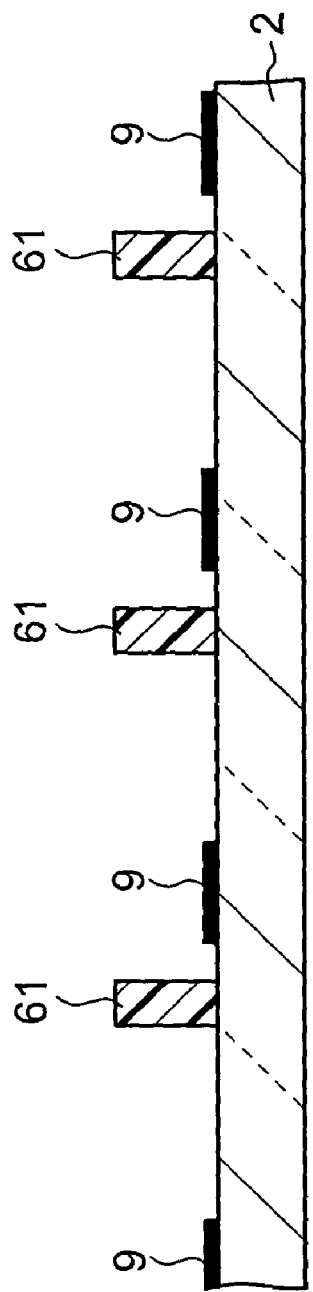
FIG. 14A, FIG. 14B, and FIG. 14C are diagrams showing the forming method of the non-colored layer and color filter in the liquid crystal element in the sixth embodiment of the present invention.
Figure 14B:
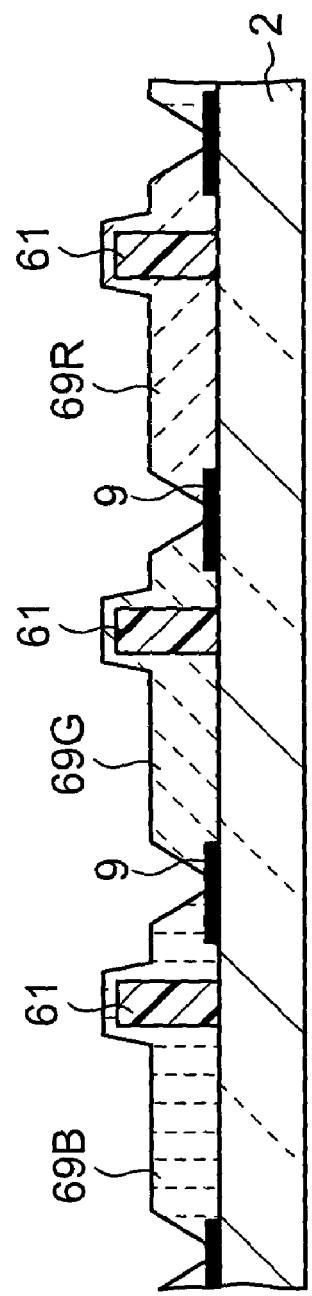
Figure 14C:
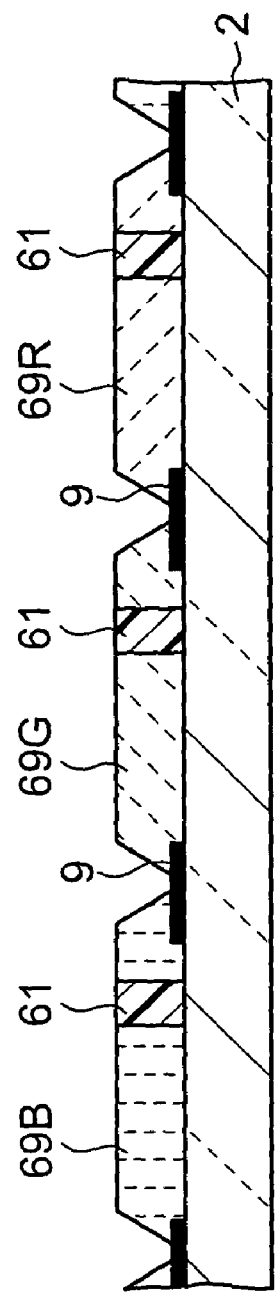

FIGS. 12 to 14C show the sixth embodiment of the present invention, and FIG. 12 is a cross sectional view of a part of a liquid crystal element, FIG. 13 is a plane view of a plurality of pixels of the liquid crystal element, and non-colored layers and color filters, and FIGS. 14A to 14C are diagrams showing the forming method of a non-colored film and color filter in the making of the liquid crystal element.

The structures of the color filters and transmission members of the liquid crystal display device of this embodiment are different from that of the above mentioned first embodiment. The same members are given the same reference numerals, and the descriptions will be omitted.

As shown in FIG. 12, the liquid crystal element 62 used in this liquid crystal display device has a liquid crystal layer 4 between a front side transparent substrate 2, which is arranged as the observing side of the display (upper side in FIG. 2), and a transparent substrate 3, which is facing the front side substrate 2, and at least one transparent electrode 5 are provided in either one inner surface of the opposing fronts side substrate 2 and back side substrate 3, and at the other inner surface, a plurality of transparent electrodes 6 for forming a plurality of pixels by the region which faces the at least one electrode 5 are provided. A plurality of reflection films 8, each of the reflection films 8 corresponding to a pre-determined region in the plural pixels Pix are provided behind the liquid crystal layer 4 of the liquid crystal element 62, and by the region of which the reflection films 8 of the plural pixel Pix are provided, reflection parts Pr are formed, wherein light enters from the front side, and is reflected by the reflection films 8, and goes out from the front side, and by the region other than the reflection parts Pr of the plural pixels Pix, transmission parts Pt are formed, wherein light is sent out to the front side by transmitting the light coming from the back side.

This liquid crystal element 62 is an active matrix liquid crystal element which for example contains TFT (Thin Film Transistor) as an active element, and the electrode 5 which is placed on the inner surface of the front side substrate 2, is a common electrode in a single film form, and the electrodes 6 which are placed on the inner surface of the back side substrate 3 is a plurality of pixel electrodes formed being placed line-wise and column-wise, namely in a matrix form.

On the inner surface of the front side substrate 2, grid-like light-shielding films 9, corresponding to the parts between the plural pixels Pix, are formed.

In the parts corresponding to the reflection parts Pr of the plural pixels Pix, on the inner surface of the front side substrate 2, a non-colored layer 61 made of photosensitive transparent resin provided in a part of the reflection part Pr, is provide, and in the part other than the part where the non-colored layer 61 is provided, color filters 69R, 69G, and 69B of for example red, green, and blue are provided so that the side surface of the filter that surrounds the non-colored layer 61, and contacts the circumference surface of the non-colored layer 61.

As shown in FIG. 13, this liquid crystal element 62 includes the pixels Pix arranged in a delta arrangement (also known as mosaic arrangement). In the delta arrangement, the pixel Pix corresponding to the red filter 9R, the pixel Pix corresponding to the green filter 9G, and the pixel Pix corresponding to the blue filter 9B, are disposed alternately, and the pixels Pix corresponding to the same color filters 9R, 9G, and 9B disposed in each line, being displaced to the pixels Pix in the next lines by 1.5 pitch sideways.

FIG. 12 represents a cross section of the red, green, and blue color filters corresponding to each pixel, disposed in a zigzag arrangement.

In this embodiment, as shown in FIG. 12 and FIG. 13, the non-colored layer 61 is formed corresponding to the central part excluding the rim part of the reflection part Pr of each pixel Pix, and the red, green, and blue color filters 69R, 69G, and 69B are formed in a larger contour than the pixel Pix. Namely, the color filters comprise a rim part placed at the parts corresponding to the parts in between the plural pixels Pix, and are formed in the region other than the region wherein the non-colored layer 61 of each pixel Pix is placed.

Furthermore, in this embodiment, the red, green, and blue color filters 69R, 69G, and 69B, are respectively formed in the same film thickness throughout the parts corresponding to the reflection parts Pr and the parts corresponding to the transmission parts Pt of the pixels Pix, to the non-colored layers 61 are formed in the same thickness as the film thickness of the color filters 69R, 69G, and 69B.

Concerning the red, green, and blue color filters 69R, 69B, and 69B, importance is placed on the color reproducibility of the light emitted from the transmission part Pt of each pixel Pix. Particularly, each color filter 69R, 69G, and 69 is formed in a film thickness so that a high color reproducibility of emitted light can be realized. Additionally, the ratio of the area of the part corresponding to the reflection part Pr of the each color filter 69R, 69G, and 69B, to the area of the non-colored layer 61 is set to a ratio so that a high color reproducibility of the mixed light of the colored light which was colored transmitting to and from the part corresponding to the reflection part Pr of each color filter 69R, 69G, and 69B, and the non-colored light which transmitted the non-colored layer 61, can be realized.

It is omitted in the drawings, but on the inner surface of either the front side substrate 2 or the back side substrate 3, for example on the inner surface of the back side substrate 3, a plurality of columnar spacers having a predetermined height are provided in between the plural pixels Pix, in the same pitch as the pixel pitch. Furthermore, on the inner surface of both the front side substrate 2 and back side substrate 3, alignment films 13 and 14 covering the electrodes 5 and 6, and the columnar spacer are provided.

The back side substrate 3, contacts the end of the not shown plural columnar spacers, provided in the inner surface of the back side substrate 3, to the inner surface of the front side substrate 2. The gap of the front side substrate 2 and the back side substrate 3 is defined by the plural columnar spacers, and the front side substrate 2 and the back side substrate 3 are jointed through the not shown rim-shaped seal member which surrounds the display area where the plural pixels Pix are arranged in a matrix form.

The liquid crystal element 62 is produced by a method of forming the light blocking film 9, plural non-colored layers 61, red, green, and blue color filters 69R, 69G, and 69B, common electrode 5, and alignment film 13 on the inner surface of the front side substrate 2, and forming the plural TFTs 7, not shown gate wirings and data wirings, plural picture electrodes 6, plural columnar spacers, and alignment film 14 on the inner surface of surface of the back side substrate 3, and after the front side substrate 2 and back side substrate 3 are defined the substrate gap by the plural columnar spacer and jointed through the rim-shaped seal member, liquid crystal is filled in by a vacuum infusion method to the region surrounded by the rim-shaped seal member in between the substrates 2 and 3, from a not shown liquid inlet formed by partially lacking one side of the rim-shaped seal member, and after that sealing the liquid inlet.

In this producing method, the non-colored layer 61 and the colored filters 69R, 69G, and 69B are formed as below.

First, after the light shielding film 9 is formed on the inner surface of the front side substrate 2, photosensitive transparent resin having the characteristic of not diffusing light, is coated to the inner surface of the substrate 2, and by exposing and developing the resin film, and patterning the resin film to shapes each corresponding to parts of the inner surface of the reflection parts Pr of the plural pixels Pix, the plural non-colored layers 61 are formed in a thicker film thickness than the color filters 69R, 69G, and 69B.

Because this photosensitive transparent resin is a non-diffusing resin that does not include particles and pigments that diffuse light, the irradiated light is not diffused at the exposing time of the resin film coated on the inner surface of the substrate 2. Therefore, by irradiating light from an orthogonal direction to the surface of the substrate 2, the side surface of a plurality of non-colored layers 61 can be accurately formed approximately orthogonal to the substrate 2.

Next, pigment added photosensitive color resist is coated on to the substrate 2 that the plural non-colored layers 61 are formed, and after exposing and developing the color resist film, and patterning the color resist film to correspond to the plural pixels Pix, and be a larger exterior shape than the pixels Pix. Red, green, and blue color filters 69R, 69G, and 69B, are sequentially formed, so that their rim parts correspond to the parts in between the plural pixels Pix.

In the forming of these color filters 69R, 69G, and 69B, because irradiated light is scattered by the pigment in the color resist, at the exposure time of the color resist film, the region that is not a target for exposure of the color resist film, is also exposed to a certain extent, and the rim parts of the color filters 69R, 69G, and 69B which were developed and patterned after exposure, are formed in a cross sectional shape so that the film thickness gradually becomes thinner going towards the outer edge of the filter, as shown in FIG. 14B. However, in this embodiment, because the color resist film is patterned in a larger contour than the pixels Pix, namely because the rim parts are patterned to correspond to the parts in between the plural pixels Pix, color filters 69R, 69G, and 69B are formed so that the film thickness of the parts corresponding to the inner regions of the plural pixels Pix are even, except for the parts of the non-colored layer 61.

Then, the part sticking out of the color filters 69R, 69G, and 69B of the plural non-colored layers 61, together with the color resist attached to the part sticking out, is removed by etching, cutting, or scraping, and the height of the parts of the periphery of the non-colored layer 61 of the color filters 69R, 69G, and 69B, is completed at the same height as the height of the other parts, at the same time making the height of the plural non-colored layers 61 the same height as the color filters 69R, 69G, and 69B.

Namely, this method of producing liquid crystal element 62 is a method that after forming a plurality of non-colored layers 61 at a film thickness thicker than the color filters 69R, 69G, and 69B, on the inner surface of the front side substrate 2, by applying photosensitive color resist on the substrate 2, and patterning the plural non-colored layers 61 to an external shape corresponding to the plural pixels Pix, red, green, and blue color filters 69R, 69G, and 69B are formed, and after that removes the color resist, which is on the non-colored layers 61.

Because the liquid crystal element 62 of this embodiment has on the inner surface of the substrate 2, non-colored layers 61, wherein each part of the inner surface of the reflection parts Pr of the plural pixels Pix correspond to the non-colored layers 61, and further has red, green, and blue color filters 69R, 69G, and 69B respectively corresponding to the plural pixels Pix, excluding the parts where the non-colored layers 61 are provided. The colored light that was colored by transmitting the color filters 69R, 69G, and 69B, in a one-way direction, and the colored light that was colored by transmitting to and from the color filters 69R, 69G, and 69B, and the non-colored light that transmitted the non-colored layer can be emitted.

Furthermore, in this liquid crystal element, the non-colored layer 61 is formed of non-diffusing photosensitive transparent resin. Therefore, by applying the photosensitive transparent resin to the inner surface of the substrate 2, and carrying out exposing and developing, the side surface of the non-colored layer 61 can be formed precisely, approximately orthogonal to the substrate 2.

Also, in this liquid crystal element, because the side surface of each filter that surrounds the non-colored layer of each color filter 69R, 69G, and 69B, contacts the periphery surface of the non-colored layer 61, the film thickness of the parts corresponding to the reflection parts Pr of the color filters 69R, 69G, and 69B, can be made even, throughout the whole region.

Therefore, according to this liquid crystal element 62, the ratio of the colored light and non-colored light that are emitted from the reflection parts Pr of the plural pixels Pix, can be precisely set at a predetermined ratio, and can improve the color reproducibility of the light emitted from the reflection part Pr.

Furthermore, as shown in FIGS. 14A to 14C, the producing method of the liquid crystal element is characterized in that by coating photosensitive transparent resin that does not diffuse light, on the inner surface of the substrate 2, and by exposing and developing the resin film, and patterning the resin film to shapes each corresponding to a part of the reflection parts Pr of the plural pixels Pix, the plural non-colored layers 61 are formed in a thicker film thickness than the color filters 69R, 69G, and 69B, and after that pigment added photosensitive color resist is coated onto the substrate 2, and after exposing and developing the color resist film, by patterning the color resist film so that it corresponds to the plural pixels Pix, red, green, and blue color filters 69R, 69G, and 69B are formed, and at the same time, the color resist on the non-colored layer 61 is removed. According to this producing method, the liquid crystal element 62 can be gained, that has on the inner surface of the substrate 2, non-colored layers 61, wherein each part of the reflection parts Pr of the plural pixels Pix correspond to the non-colored layers 61, and further has red, green, and blue color filters 69R, 69G, and 69B respectively corresponding to the plural pixels Pix, excluding the parts where the non-colored layers 61 are provided, wherein the side surface of the filter that surrounds the non-colored layer 61 and contacts the periphery surface of the non-colored layer 61.

Also, in this embodiment, in a case where forming the non-colored layer 61 and color filters 69R, 69G, and 69B on the inner surface of the front side substrate 2, the non-colored layer 61 is formed in a thickness thicker than the film thickness of the color filters 69R, 69G, and 69B, and because the non-colored layer 61 is made so that the height of the surface is at the same height as the surfaces of the color filters 69R, 69G, and 69B by removing the part sticking out of the color filters 69R, 69G, and 69B with the color resist attached to the part sticking out, the liquid crystal layer thickness of the reflection parts Pr of the plural pixels Pix, is made even through the colored light emitting regions corresponding to the color filters 69R, 69G, and 69B, to the non-colored light emitting region corresponding to the non-colored layer 61, and the electro-optic characteristics of the liquid crystal layer 4 in the colored light emitting region and the non-colored emitting region of the reflection part Pr can be the same.

Furthermore, in a case where the non-colored layer 61 and color filters 69R, 69G, and 69B are formed on the inner surface of the front side substrate 2, the non-colored layer 61 may be formed in the same thickness as the film thickness of the color filters 69R, 69G, and 69B, from the beginning. In that case, only the color resist on the non-colored layer 61 needs to be removed, after forming the color filters 69R, 69G, and 69B.

Seventh Embodiment

Figure 15:
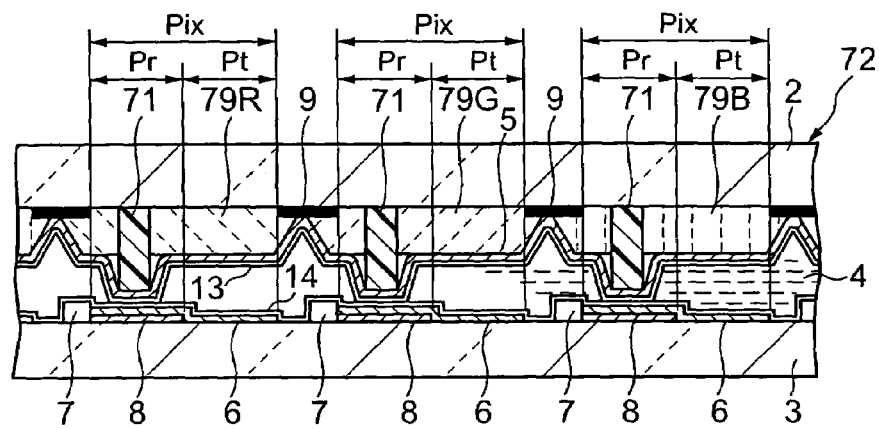
FIG. 15 is a cross sectional view of a part of the element in the sixth embodiment of the present invention.
Figure 16A:
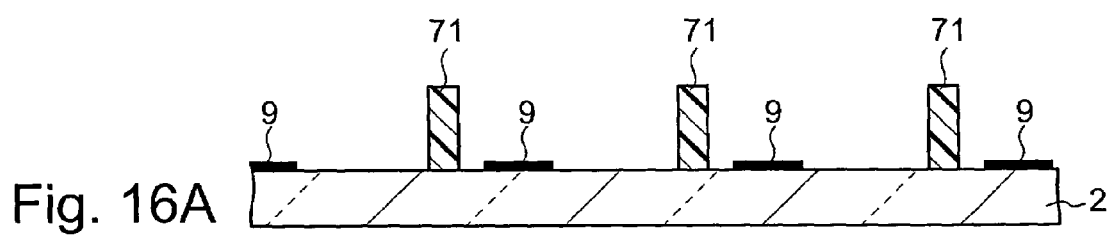
FIG. 16A, FIG. 16B, and FIG. 16C are diagrams showing the forming method of the non-colored layer and color filter of the manufacturing of liquid crystal elements in the seventh embodiment of the present invention.
Figure 16B:
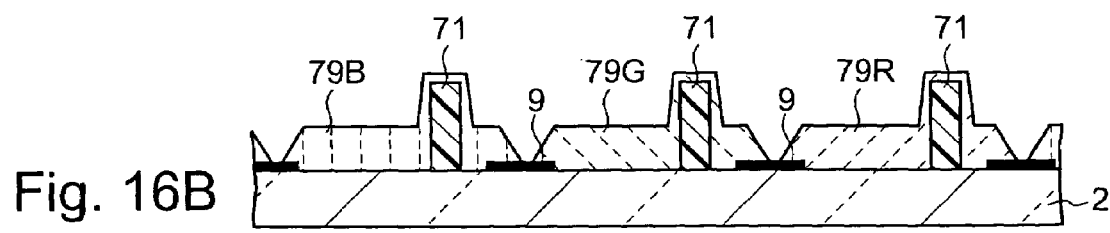
Figure 16C:
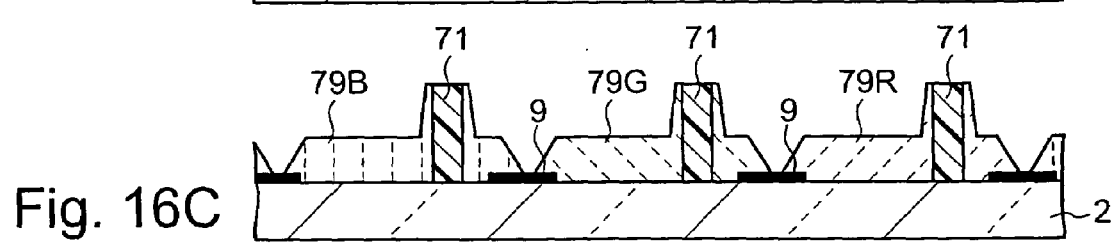

FIG. 15 and FIGS. 16A to 16C show the seventh embodiment of the present invention, and FIG. 15 is a cross sectional view of a part of a liquid crystal element, FIGS. 16A to 16C are diagrams showing the forming method non-colored layers and color filters, in the producing of the liquid crystal element.

In the liquid crystal element 72 of this embodiment, on the inner surface of the front side substrate 2, the non-colored layers 71 partially provided, respectively corresponding to the reflection parts Pr of the plural pixels Pix, protrude from the color filters 79R, 79G, and 79B, at a predetermined height, and by the protruding end contacting the inner surface of the back side substrate 3, the gap between the front side substrate 2 and the back side substrate 3 is defined by the non-colored layers 71.

Furthermore, in the liquid crystal element 72 of this embodiment, the non-colored layer 71 is also a columnar spacer for defining the substrate gap. Because the other structures are the same as the liquid crystal element in the above mentioned first embodiment, the same descriptions will be omitted by using the same reference numerals.

In the forming method of the liquid crystal element of this embodiment, the non-colored layers 71 and color filters 79R, 79G, and 79B are formed as below.

First, after the light shielding film 9 is formed on the inner surface of the front side substrate 2, by coating the non-diffusing photosensitive transparent resin to the inner surface of the substrate 2, and by exposing and developing the resin film, and by patterning the resin film to shapes each corresponding to parts of the reflection parts Pr of the plural pixels Pix, the plural non-colored layers 71 are formed in a thickness wherein a predetermined height is added to the film thickness of the color filters 79R, 79G, and 79B, as FIG. 16A.

In this case also, because the photosensitive transparent resin is non-diffusing resin that does not containing particles or pigments that diffuse light, the plural non-colored layers 71 can be formed precisely in a shape, wherein the periphery surface of each non-colored layer 71 is approximately orthogonal to the surface of the substrate 2.

Next, pigment added photosensitive color resist is coated on to the substrate 2 that the plural non-colored layers 61 are formed, and after exposing and developing the color resist film, by patterning the color resist film so that it corresponds to the plural pixels Pix, and has larger exterior shapes than the exterior shapes of the pixels Pix, the red, green, and blue color filters 69R, 69G, and 69B, are sequentially formed corresponding to the parts wherein the rim parts correspond to the parts in between the plural pixels Pix, as shown in FIG. 16B.

Then, among the color resist applied to the parts protruding from the color filters 79R, 79G, and 79B of the plural non-colored layers 70, the color resist on the top surface of the non-colored layers 71, is removed as shown in FIG. 16C, by etching, cutting, or scraping, etc.

Namely, the producing method of this liquid crystal element is a method that after forming a plurality of non-colored layers 71 to a thickness adding the predetermined thickness to the film thickness of the color filters 79R, 79G, and 79B, on the inner surface of the front side substrate 2, by using the photosensitive color resist on the substrate 2, and by patterning the non-colored layers 71 in an external shape corresponding to the plural pixels Pix, the red, green, and blue color filters 79R, 79G, and 79B are formed, and the color resist on the top surface of the non-colored layer is removed.

The liquid crystal element of this embodiment, emits the colored light colored by the color filters 79R, 79G, and 79B, and transmitting the liquid crystal layer 4, from the whole region of the transmission parts Pt, and the color light emitting region corresponding to the color filters 79R, 79G, and 79B of the reflection parts Pr of the plural pixels Pix, and emits the non-colored light transmitting the non-colored layer 71 without transmitting the liquid crystal layer 4 from the non-colored light emitting region corresponding to the non-colored layer 71 of the reflection parts Pr of the plural pixels Pix. In this liquid crystal element also, colored light and non-colored light can be emitted from the reflection parts Pr of the plural pixels Pix at a highly precise ratio, and excellent color reproducibility can be gained.

Furthermore, in this embodiment, because the non-colored layers 71 are also columnar spacers that define the substrate gap, an additional step for forming columnar spacers is not necessary, and the producing step of the liquid crystal element can be simplified.

Furthermore, as shown in FIGS. 16A to 16C, the producing method of the liquid crystal element is characterized in that by coating non diffusing photosensitive transparent resin to the inner surface of the substrate 2, and by exposing and developing the resin film, and patterning the resin film to correspond to each part of the reflection parts Pr of the plural pixels Pix, the plural non-colored layers 71 are formed in a thicker film thickness than the thickness of the color filters 79R, 79G, and 79B, and at the same time, the color resist on the top surface of the non-colored layers 71 is removed. According to this producing method, the liquid crystal element 72 can be gained, that has on the inner surface of the substrate 2, non-colored layers 71, wherein each part of the interior of the reflection parts Pr of the plural pixels Pix correspond to each non-colored layer 71, and further has red, green, and blue color filters 79R, 79G, and 79B respectively corresponding to the plural pixels Pix, excluding the parts where the non-colored layers 71 are provided, wherein the side surface of the each filter that surrounds the non-colored layer 71 and contacts the periphery surface of the non-colored layer 71.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2002-252311 filed on Aug. 30, 2002, Japanese Patent Application No.2002-252312 filed on Aug. 30, 2002, and Japanese Patent Application No.2002-279683 filed on Sep.

25, 2002, and includes specification, claims, drawings and summary. The disclosure of the above Japanese Patent Applications is incorporated herein by reference in its entirety.

What is claimed is:

1. A liquid crystal display device comprising:
   a front side substrate placed on an observer side of the liquid crystal display device and including an outer surface at the observer side of the liquid crystal display device and an inner surface opposite to the outer surface;
   a back side substrate positioned such that an inner surface of the back side substrate faces the inner surface of the front side substrate and such that a predetermined gap is formed between the front side substrate and the back side substrate;
   a liquid crystal layer filled between the back side substrate and the front side substrate;
   at least one common electrode formed on the inner surface of the front side substrate;
   a plurality of pixel electrodes which are made of a transparent conductive film, and which are formed on the inner surface of the back side substrate, wherein a region in which one of the plurality of pixel electrode faces said common electrode defines one pixel of a plurality of pixels of the liquid crystal display device;
   a plurality of thin film transistors provided on the inner surface of the back side substrate so as to correspond and connect to the plurality of pixel electrodes, respectively;
   a plurality of reflection films which are made of a metal film having low resistance, and which are provided on the inner surface the back side substrate, said reflection films respectively corresponding to predetermined parts of the plurality of pixels, such that each of the plurality of pixels comprises: (i) a reflection part at which the corresponding reflection film reflects light that is incident thereon along a direction from the front side substrate to the back side substrate, back along a direction from the back side substrate to the front side substrate, and (ii) a transmission part that transmits light therethrough from the back side substrate toward the front side substrate, wherein each said reflection film is formed between the inner surface of the back side substrate and the corresponding pixel electrode, and is overlaid with the corresponding pixel electrode so as to connect directly to the corresponding pixel electrode;
   a plurality of color filters provided on the inner surface of the front side substrate to correspond respectively to the plurality of pixels, at least one of said plurality of color filters corresponding to a different color than the other color filters;
   a plurality of apertures formed in a portion of each said color filter that corresponds to an inner region of the reflection part of the corresponding pixel, each said aperture being surrounded by the same color filter, which has a single color, in which the aperture is formed, wherein said portion of the color filter in which the apertures are formed excludes a portion of the color filter corresponding to a region of the corresponding pixel where the thin film transistor of the corresponding pixel is formed;
   a transparent member provided in each said aperture;
   a front side polarization plate provided at said observer side of the front side substrate; and
   a back side polarization plate provided at a side of the back side substrate on an opposite side of the liquid crystal display device from said observer side;
   wherein the color filters comprise red, blue, and green color filters, and a greater number of apertures are formed in each green color filter than in any one of the red and blue color filters.

2. The liquid crystal display device according to claim 1, wherein said transparent member comprises light diffusing particles for diffusing light.

3. The liquid crystal display device according to claim 1, wherein a thickness of the liquid crystal layer at the reflection part of each said pixel is thinner than a thickness of the liquid crystal layer at the transmission part of each said pixel.

4. The liquid crystal display device according to claim 3, wherein said transparent member provided in each said aperture is further provided on each said color filter, and comprises an adjustment film for adjusting the thickness of the liquid crystal layer at the refection parts of the plurality of pixels to a predetermined thickness.

5. The liquid crystal display device according to claim 3, wherein each said reflection film adjusts the thickness of the liquid crystal layer at the reflection part of the corresponding pixel.

6. The liquid crystal display device according to claim 1, wherein said front side substrate, said back side substrate, and the elements of the liquid crystal display device provided therebetween form a liquid crystal element that gives a transmission light transmitted therethrough a retardation change of ¼ of a wavelength $\lambda$ of the transmission light in response to a change in a voltage between the common electrode and each pixel electrode, and wherein the liquid crystal display device further comprises a $\lambda/4$ retardation plate provided between the front side polarization plate and the liquid crystal element.

7. The liquid crystal display device according to claim 1, wherein the transparent member comprises photosensitive resin.

8. The liquid crystal display device according to claim 7, wherein the transparent member has a same thickness as a thickness of each said color filter.

9. The liquid crystal display device according to claim 7, wherein the transparent member provided in each said aperture has a cross sectional shape that is substantially the same as a plane shape of each said aperture, and the transparent member is thicker than each said color filter to function as a spacer for setting a thickness of the liquid crystal layer to a predetermined thickness.

10. The liquid crystal display device according to claim 1, wherein each said color filter comprises a transmission part color filter having a predetermined thickness and positioned at the transmission part of the corresponding pixel, and a reflection part color filter having a thickness thinner than the predetermined thickness of each said transmission part color filter and provided at a position corresponding to the reflection part of the corresponding pixel.

11. The liquid crystal display device according to claim 10, wherein a thickness of the liquid crystal layer at the reflection part of each said pixel is thinner than a thickness of the liquid crystal layer at the transmission part of each said pixel.

12. The liquid crystal display device according to claim 10, wherein the transparent member comprises a light diffusing member for diffusing light.

13. The liquid crystal display device according to claim 10, wherein the front side substrate, said back side substrate, and the elements of the liquid crystal display device provided therebetween form a liquid crystal element that gives a transmission light transmitted therethrough a retardation change of ¼ of a wavelength λ of the transmission light in response to a change in a voltage between the common electrode and each pixel electrode, and wherein the liquid crystal device further comprises a λ/4 retardation plate provided between the front side polarization plate and the liquid crystal element.

14. The liquid crystal display device according to claim 10, wherein the transparent member comprises a transparent film on each said reflection part color filter, and a thickness of the liquid crystal layer at the reflection part of each said pixel is thinner than a thickness of the liquid crystal layer at the transmission part of each said pixel.

15. The liquid crystal display device according to claim 10, wherein each said reflection film adjusts the thickness of the liquid crystal layer at the reflection part of the corresponding pixel.

* * * * *